United States Patent
Fleckenstein et al.

(10) Patent No.: US 9,234,137 B2
(45) Date of Patent: Jan. 12, 2016

(54) FLAME RETARDANT

(75) Inventors: Christoph Fleckenstein, Freigericht (DE); Hartmut Denecke, Ludwigshafen (DE); Ingo Bellin, Mannheim (DE); Olaf Kriha, Neustadt (DE); Patrick Spies, Neustadt (DE); Sabine Fuchs, Mannheim (DE); Klemens Massonne, Bad Dürkheim (DE); Klaus Hahn, Kirchheim (DE); Peter Deglmann, Mannheim (DE); Maximilian Hofmann, Mannheim (DE); Alois Kindler, Grünstadt (DE)

(73) Assignee: BASF SE, Ludwigshafen (DE)

( * ) Notice: Subject to any disclaimer, the term of this patent is extended or adjusted under 35 U.S.C. 154(b) by 492 days.

(21) Appl. No.: 13/516,464

(22) PCT Filed: Dec. 15, 2010

(86) PCT No.: PCT/EP2010/069796
§ 371 (c)(1),
(2), (4) Date: Jun. 15, 2012

(87) PCT Pub. No.: WO2011/083009
PCT Pub. Date: Jul. 14, 2011

(65) Prior Publication Data
US 2012/0252911 A1 Oct. 4, 2012

(30) Foreign Application Priority Data
Dec. 16, 2009 (EP) .................. 09179445

(51) Int. Cl.
*C08J 9/16* (2006.01)
*C08K 5/1535* (2006.01)
(Continued)

(52) U.S. Cl.
CPC ............. *C09K 21/12* (2013.01); *C08J 9/0038* (2013.01); *C08J 9/14* (2013.01); *C08J 9/20* (2013.01);
(Continued)

(58) Field of Classification Search
CPC ............. C08J 9/0038; C08J 9/14; C08J 9/20; C08J 2325/04; C08K 5/49; C08K 5/53; C08K 5/523; C08K 5/5313; C08K 5/5377; C08K 5/5398; C09K 21/12; C08L 2201/02; C08L 2203/14
USPC .................. 521/56, 79, 85, 89, 90, 146
See application file for complete search history.

(56) References Cited

U.S. PATENT DOCUMENTS 4,440,880 A 4/1984 Albanesi et al.
(Continued)

FOREIGN PATENT DOCUMENTS

CA 2196632 A1 9/1997
(Continued)

OTHER PUBLICATIONS

English translation of International Preliminary Report on Patentability for PCT/EP2010/069796.
(Continued)

*Primary Examiner* — Irina S Zemel
(74) *Attorney, Agent, or Firm* — Drinker Biddle & Reath LLP

(57) ABSTRACT

Use of a phosphorus compound of the formula (I) as flame retardant,

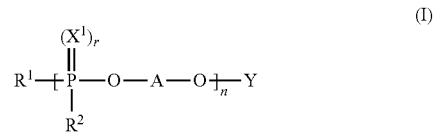

where the definitions of the symbols in the formula (I) are as follows:
A is one of the following groups:

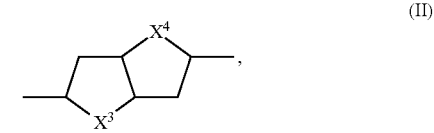

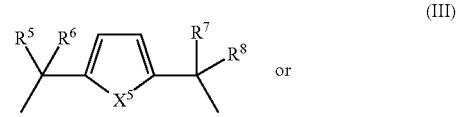

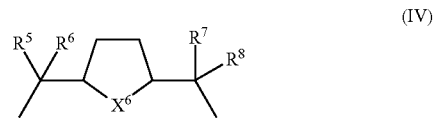

Y is $-P(=X^2)_s R^3 R^4$, H, a straight-chain or branched $C_1$-$C_{12}$-alkyl group, $C_5$-$C_6$-cycloalkyl, $C_6$-$C_{12}$-aryl, or benzyl, where the four last-mentioned groups are unsubstituted or have substitution by one or more radicals from the group of $C_1$-$C_4$-alkyl or $C_1$-$C_4$-alkenyl;
$R^1$, $R^2$, $R^3$, and $R^4$ are identical or different and are hydrogen, OH, $C_1$-$C_{16}$-alkyl, $C_1$-$C_{16}$-alkenyl, $C_1$-$C_{16}$-alkoxy, $C_1$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$ or two radicals $R^1$, $R^2$, $R^3$, or $R^4$ form, together with the phosphorus atom to which they are bonded, or the P—O-A-O—P group, a ring system;
$R^5$, $R^6$, $R^7$, and $R^8$ are identical or different and are H, $C_1$-$C_{16}$-alkyl, $C_1$-$C_{16}$-alkenyl, $C_1$-$C_{16}$-alkoxy, $C_1$-$C_{16}$-alkenoxy;
$R^9$, $R^{10}$, $R^{11}$, $R^{12}$, $R^{13}$ are identical or different and are H, $C_1$-$C_{16}$-alkyl, $C_1$-$C_{16}$-alkenyl, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy;
$X^1$ and $X^2$ are identical or different and are S or O;
r and s are identical or different and are 0 or 1;
$X^3$, $X^4$, $X^5$, and $X^6$ are identical or different and are S or O, and
n is a natural number from 1 to 50.

23 Claims, No Drawings

(51) Int. Cl.
| | |
|---|---|
| *C09K 21/12* | (2006.01) |
| *C08J 9/00* | (2006.01) |
| *C08J 9/14* | (2006.01) |
| *C08J 9/20* | (2006.01) |
| *C08K 5/49* | (2006.01) |
| *C08K 5/53* | (2006.01) |
| C08K 5/523 | (2006.01) |
| C08K 5/5313 | (2006.01) |
| C08K 5/5377 | (2006.01) |
| C08K 5/5398 | (2006.01) |

(52) U.S. Cl.
CPC ... *C08K 5/49* (2013.01); *C08K 5/53* (2013.01); *C08J 2325/04* (2013.01); *C08K 5/523* (2013.01); *C08K 5/5313* (2013.01); *C08K 5/5377* (2013.01); *C08K 5/5398* (2013.01); *C08L 2201/02* (2013.01); *C08L 2203/14* (2013.01)

(56) References Cited

U.S. PATENT DOCUMENTS

| | | | |
|---|---|---|---|
| 4,698,215 | A | 10/1987 | Albanesi et al. |
| 5,569,015 | A | 10/1996 | Gerlier |
| 5,969,015 | A | 10/1999 | Zinke et al. |
| 6,420,442 | B1 * | 7/2002 | Dietzen et al. ............ 521/82 |
| 8,563,637 | B2 * | 10/2013 | Jakupca et al. .......... 524/128 |
| 2006/0229372 | A1 | 10/2006 | Onishi et al. |
| 2008/0058435 | A1 | 3/2008 | Allmendinger et al. |
| 2008/0083606 | A1 | 4/2008 | Volland et al. |

FOREIGN PATENT DOCUMENTS

| | | |
|---|---|---|
| CN | 101481390 A | 7/2009 |
| CN | 101544624 A | 9/2009 |
| DE | 19741777 A1 | 3/1998 |
| EP | 1791896 A1 | 6/2007 |
| WO | WO-96/17853 A1 | 6/1996 |
| WO | WO-99/10429 A1 | 3/1999 |
| WO | WO-03062251 A1 | 7/2003 |
| WO | WO-2006063287 A2 | 6/2006 |
| WO | WO-2008/088487 A2 | 7/2008 |
| WO | WO-2009/035881 A2 | 3/2009 |

OTHER PUBLICATIONS

Grachev, et. al., J. of Gen. Chem., vol. 65, No. 12, Part 1, 1995, p. 1785-1789.
Demaine, et. al., Biochemical and Biophysical Research Communications, vol. 88, No. 3, 1979, p. 835-840.
Reetz, et. al., Angewandte Chemie, Int. Ed. vol. 38, No. 1-2, p. 179-181.
Hauptmann, et. al., Organometallics, 1998, vol. 17, p. 4976-4982.
International Search Report for PCT/EP2010/069796 mailed Apr. 28, 2011.
International Preliminary Report on Patentability for PCT/EP2010/069796, 2011.

* cited by examiner

FLAME RETARDANT

RELATED APPLICATIONS

This application is a national stage application (under 35 U.S.C. §371) of PCT/EP2010/069796, filed Dec. 15, 2010, which claims benefit of European Patent Application No. 09179445.3, filed Dec. 16, 2009.

The invention relates to the use of phosphorus compounds as flame retardants, and also to polymers, in particular foams, which comprise these flame retardants, to a process for the production of flame-retardant polymers, in particular foams, and also to novel phosphorus compounds.

The flame retardants currently used in plastics are mainly polyhalogenated hydrocarbons, optionally in combination with suitable synergists, for example organic peroxides or nitrogen-containing compounds. A typical representative of these traditional flame retardants is hexabromocyclododecane (HBCD), which is used in polystyrene, for example. Because of bioaccumulation, and also because of the persistent nature of some polyhalogenated hydrocarbons, the plastics industry is making great efforts to find replacements for halogenated flame retardants.

Flame retardants should ideally exhibit not only a high level of flame-retardant action in the plastic at a low loading level but also exhibit adequate resistance to heat and hydrolysis for processing purposes. They should also exhibit an absence of bioaccumulation and persistency.

WO-A 2009/035881 and WO-A 2008/088487 describe halogen-free flame retardants having sulfur-phosphorus bonds, in particular thiophosphates and thiophosphonates.

There is nevertheless much room for improvement in flame retardants of this type, for example because the amounts needed of halogen-free flame retardants are generally markedly higher if they are to achieve the same flame retardancy as halogen-containing flame retardants. Halogen-containing flame retardants which can be used with thermoplastic polymers, such as polystyrene, can therefore often not be used in polymer foams, since they either disrupt the foaming process or affect the mechanical and thermal properties of the polymer foam. The large amounts of flame retardant can moreover reduce the stability of the suspension during the production of expandable polystyrene by suspension polymerization. Another factor is that when the flame retardants used with thermoplastic polymers are used with polymer foams their effect is often unpredictable, because of differences in fire behavior and differences in fire tests.

The object of the invention is therefore to provide compounds which are firstly halogen-free and which secondly exhibit good flame-retardant properties in polymers, in particular in polymer foams, even when the amounts used are small.

It has been found that certain phosphorus compounds of the formula (I) have particular suitability for use as flame retardants.

Although certain compounds of the formula (I) are already known from the following references, their suitability as flame retardants cannot be inferred from these documents: DeMaine, M. M.; Benkovic, S. J., Biochemical and Biophysical Research Communications (1979), 88(3), 835-40 (D1); Grachev, M. K.; Anfilov, K. L.; Bekker, A. K.; Nifant'ev. E. E., Zhurnal Obshchei Khimii (1995), 65(12), 1946-50 (D2), (D6), (D7), (D20); Petrov, K. A.; Nifant'ev, E. E.; Shcheglov, A. A.; Khudyntsev, N. A. Zhurnal Obshchei Khimii (1962), 32 3074-80 (D3), (D4), (D5), (D22); Chen, Min-dong; Yuan, Jian-chao; Zhang, Yu-hua; Lu, Shi-jie; Sun, Wei; Wang, Lailai., Fenzi Cuihua (2001), 15(5), 385-387 (D8), (D9); Kurochkina, G. I.; Grachev, M. K.; Vasyanina, L. K.; Piskaev, A. E.; Nifant'ev, E. F., Doklady Akademii Nauk (2000), 371(2), 189-193 (D10), (D25), U.S. Pat. No. 5,569,015 (D11), (D26); Reetz, Man-fred T.; Neugebauer, Torsten, Angew. Chem., Int. Ed. (1999), 38(1/2), 179-181 (D12), (D13), (D15), (D16), (D17); Dieguez, Montserrat; Pamies, Oscar; Claver, Carmen., Journal of Organic Chemistry (2005), 70(9), 3363-3368 (D14), DE-A 197 41 777 (D18), (D19), (D21); Nifant'ev, E. E.; Tuseev, A. P.; Koshurin, Yu. I., Otd. Obshch. i Tekhn. Khim. (1965), 38-41 (D23);

Nifant'ev, E. E.; Markov, S. M.; Tuseev, A. P.; Vasil'ev, A. F. Otd. Obshch. i Tekhn. Khim. (1965), 42-5 (D24); Hauptman, Elisabeth; Shapiro, Rafael; Marshall, William, Organometallics (1998), 17(23), 4976-4982, (D27), (D28), (D29), (D30).

The invention therefore provides the use of phosphorus compounds of the formula (I) as flame retardant,

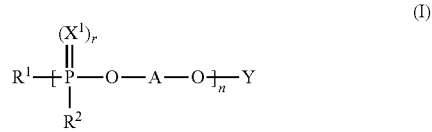

(I)

where the definitions of the symbols in the formula (I) are as follows:

A is one of the following groups:

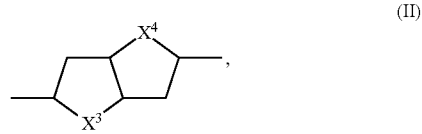

(II)

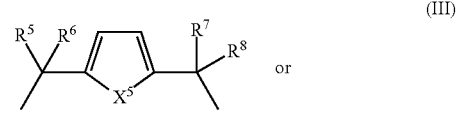

(III)

or

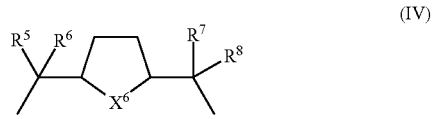

(IV)

Y is $-P(=X^2)_sR^3R^4$, H, a straight-chain or branched $C_1$-$C_{12}$-alkyl group, $C_5$-$C_6$-cycloalkyl, $C_6$-$C_{12}$-aryl, or benzyl, where the four last-mentioned groups are unsubstituted or have substitution by one or more radicals $C_1$-$C_4$-alkyl or $C_2$-$C_4$-alkenyl;

$R^1$, $R^2$, $R^3$, and $R^4$ are identical or different and are hydrogen, OH, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$, $COR^{10}$, $COOR^{11}$, $CONR^{12}R^{13}$ or two radicals $R^1$, $R^2$, $R^3$, or $R^4$ form, together with the phosphorus atom to which they are bonded, or the P—O-A-O—P group, a ring system;

$R^5$, $R^6$, $R^7$, and $R^8$ are identical or different and are H, $C_1$-$C_{16}$-alkyl, $C_2$-$C_{16}$-alkenyl, $C_1$-$C_{16}$-alkoxy, $C_2$-$C_{16}$-alkenoxy;

$R^9$, $R^{10}$, $R^{11}$, $R^{12}$, $R^{13}$ are identical or different and are H, $C_1$-$C_{16}$-alkyl, $C_2$-$C_{16}$-alkenyl, $C_6$-$C_{10}$-aryl, $C_6$-$C_{10}$-aryl-$C_1$-$C_{16}$-alkyl, $C_6$-$C_{10}$-aryl-$C_1$-$C_{16}$-alkoxy;

$X^1$ and $X^2$ are identical or different and are S or O;

r and s are identical or different and are, preferably identically, 0 or 1;

$X^3$, $X^4$, $X^5$, and $X^6$ are identical or different and are S or O, and n is a natural number from 1 to 50.

The invention also provides phosphorus compounds of the formula (I), with the exception of the following compounds:
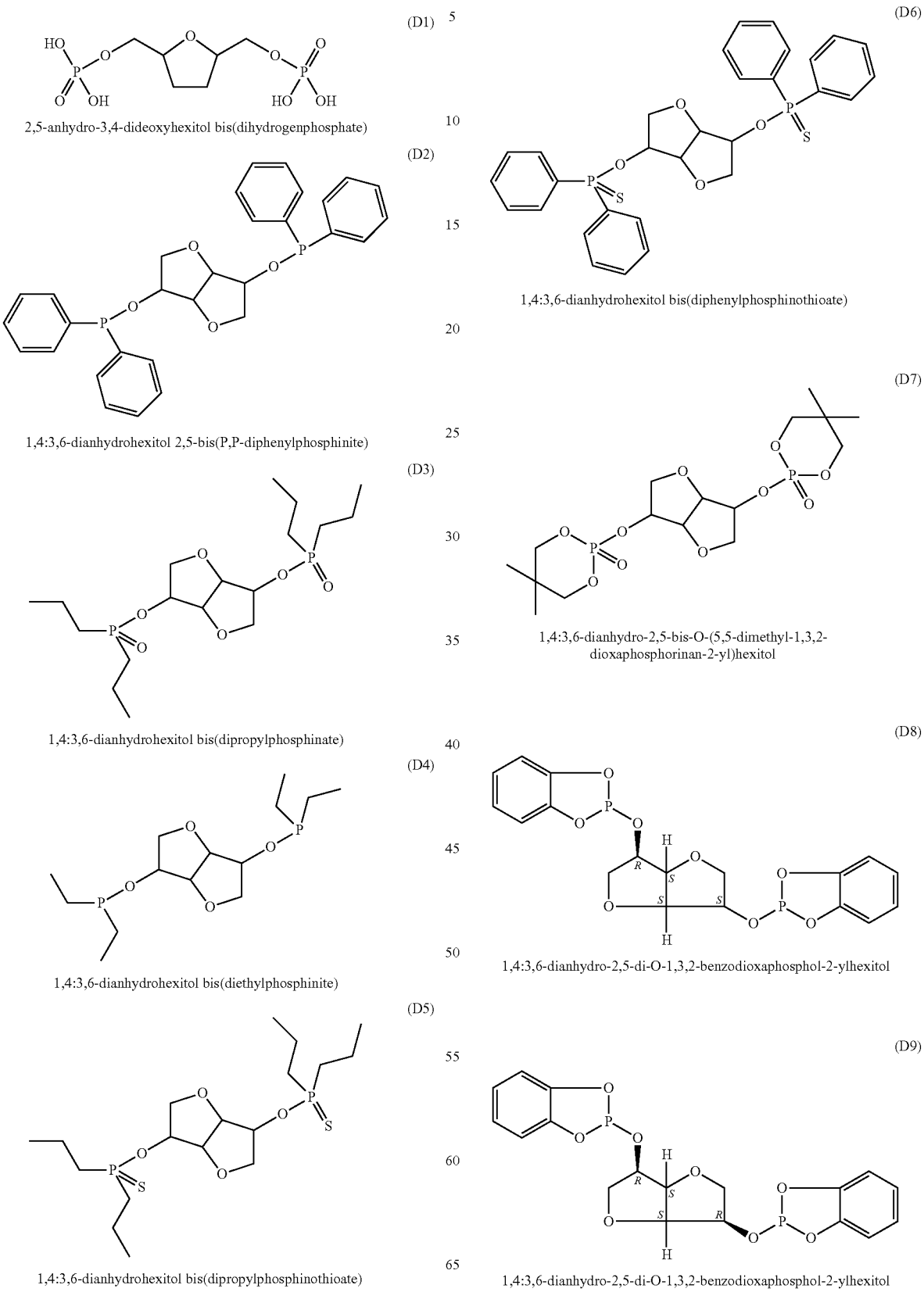

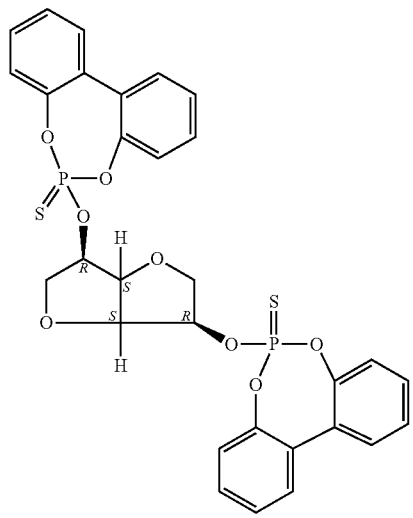

1,4:3,6-dianhydro-2,5-bis-O-(6-sulfidodibenzo[d,f][1,3,2]dioxaphosphepin-6-yl)hexitol (D10)

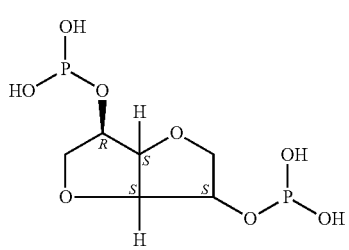

1,4:3,6-dianhydrobis(dihydrogenphosphite)hexitol (D11)

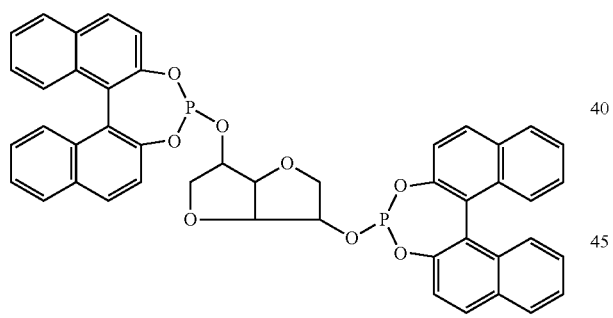

1,4:3,6-dianhydro-2,5-bis-O-[(11bR)dinaphtho[2,1-d:1',2'-f][1,3,2]dioxaphosphepin-4-yl]hexitol (D12)

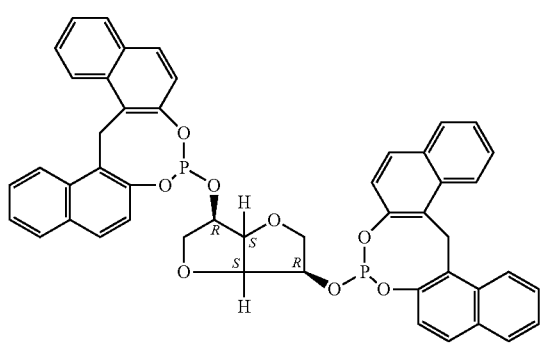

1,4:3,6-dianhydro-2,5-bis-O-(16H-dinaphtho[2,1-d:1',2'-g][1,3,2]dioxaphosphocin-8-yl)hexitol (D13)

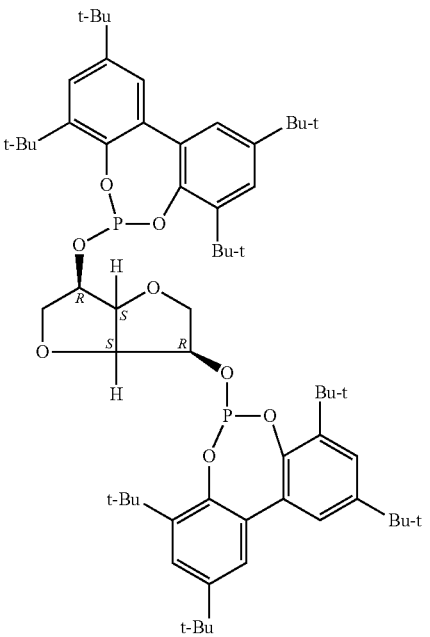

1,4:3,6-dianhydro-2,5-bis-O-[2,4,8,10-tetrakis(1,1-dimethylethyl)dibenzo[d,f][1,3,2]dioxaphosphepin-6-yl]hexitol (D14)

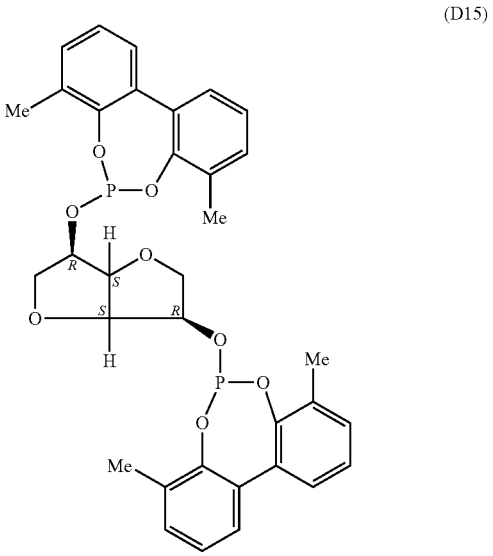

1,4:3,6-dianhydro-2,5-bis-O-(4,8-dimethyldibenzo[d,f][1,3,2]dioxaphosphepin-6-yl)hexitol (D15)

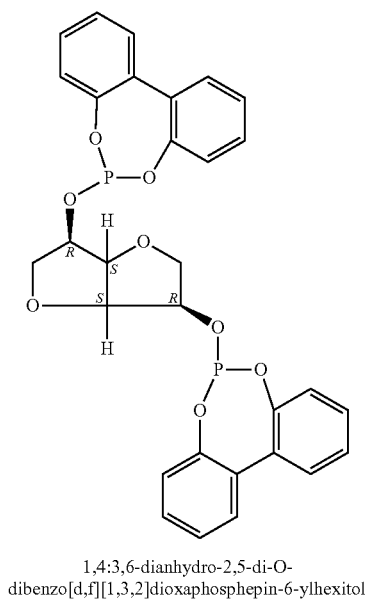

1,4:3,6-dianhydro-2,5-di-O-
dibenzo[d,f][1,3,2]dioxaphosphepin-6-ylhexitol

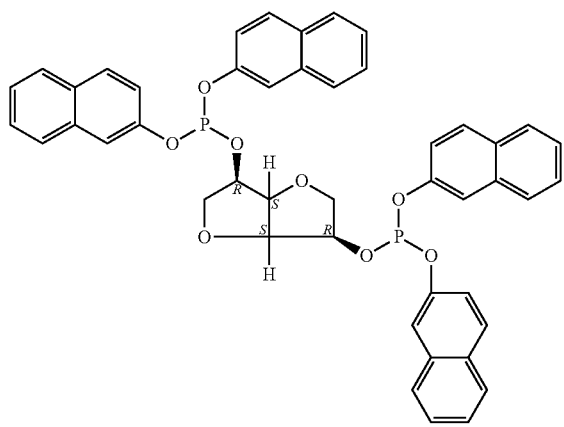

1,4:3,6-dianhydrobis(di-2-naphthalenyl phosphite)hexitol

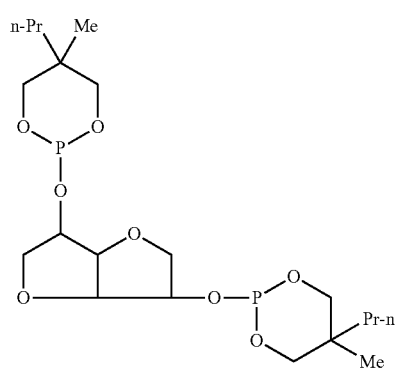

1,4:3,6-dianhydro-2,5-bis-O-(5-methyl-5-propyl-
1,3,2-dioxaphosphorinan-2-yl)hexitol

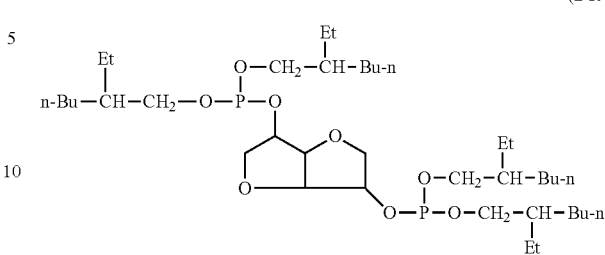

1,4:3,6-dianhydrobis[bis(2-ethylhexyl) phosphite]hexitol

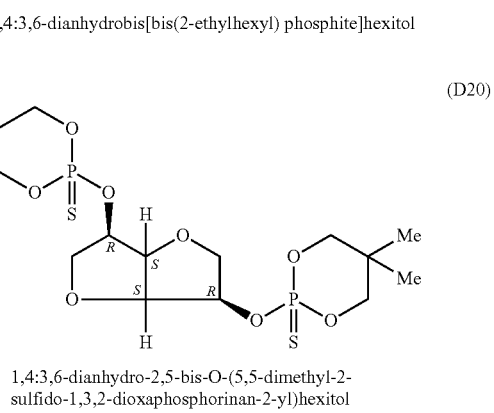

1,4:3,6-dianhydro-2,5-bis-O-(5,5-dimethyl-2-
sulfido-1,3,2-dioxaphosphorinan-2-yl)hexitol

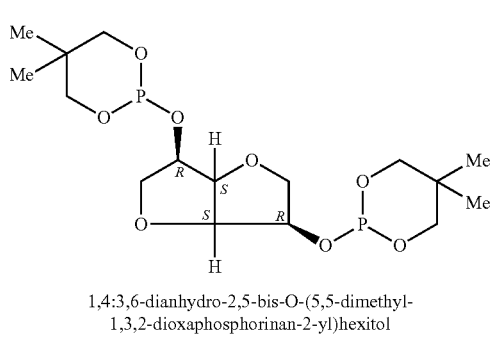

1,4:3,6-dianhydro-2,5-bis-O-(5,5-dimethyl-
1,3,2-dioxaphosphorinan-2-yl)hexitol

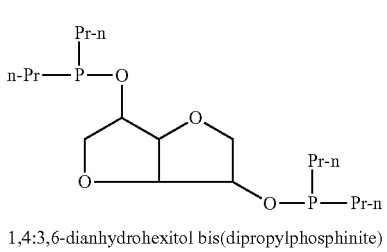

1,4:3,6-dianhydrohexitol bis(dipropylphosphinite)

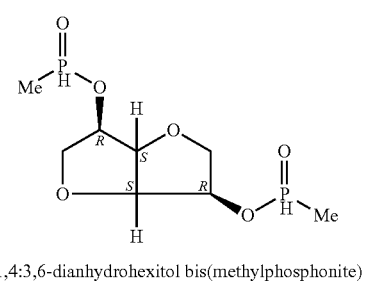

1,4:3,6-dianhydrohexitol bis(methylphosphonite)

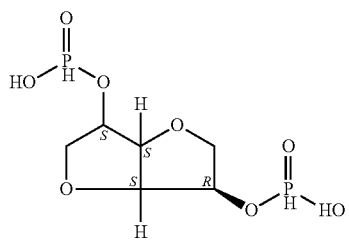

1,4:3,6-dianhydrohexitol bis(hydrogenphosphonate) (D24)

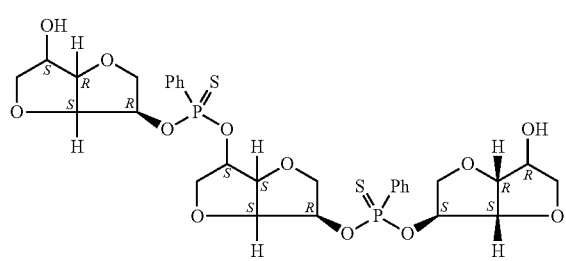

1,4:3,6-dianhydro-D-glucitol-2,5':2',5''-bis(phenylphosphonothioate) (D25)

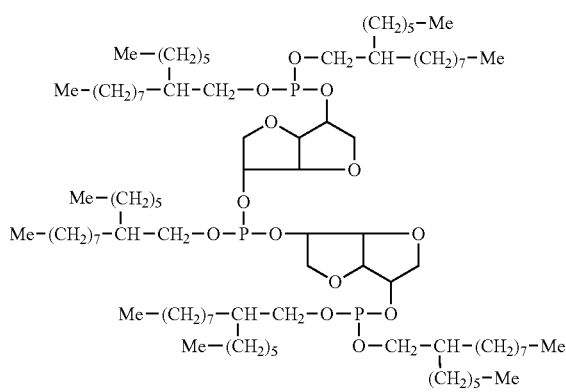

1,4:3,6-dianhydrohexitol 2,2'-(2-hexyldecyl phosphite)-5,5'-bis[bis(2-hexyldecyl) phosphite] (D26)

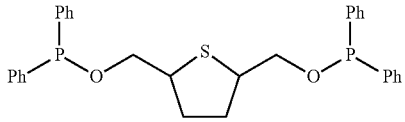

hexitol-2,3,4,5-tetradeoxy-2,5-epithio bis(diphenylphosphinite) (D27)

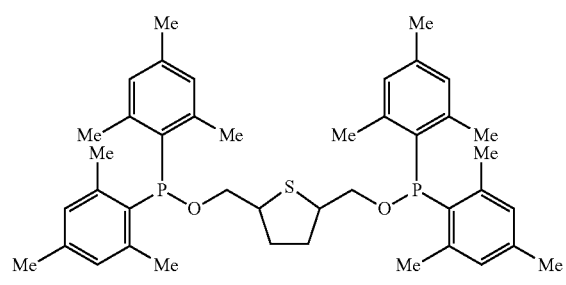

hexitol-2,3,4,5-tetradeoxy-2,5-epithio bis[bis(2,4,6-trimethylphenyl)phosphinite] (D28)

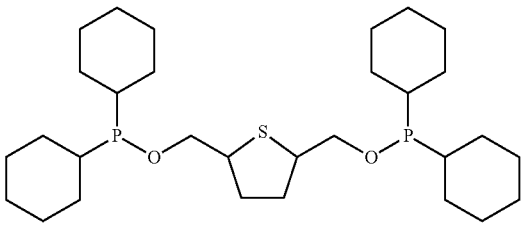

hexitol-2,3,4,5-tetradeoxy-2,5-epithio bis(dicyclohexylphosphinite) (D29)

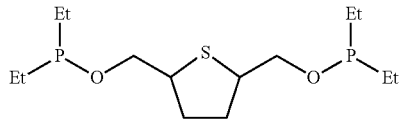

hexitol-2,3,4,5-tetradeoxy-2,5-epithio bis(diethylphosphinite) (D30)

The invention further provides a process for providing flame retardancy to a material, where a flame retardant comprising one or more compounds of the formula (I) is added to the material.

The invention also provides a polymer foam comprising one or more compounds of the formula (I), preferably an expandable styrene polymer, in particular obtainable by an extrusion process or a suspension process. The invention therefore also provides a process for the production of a flame-retardant, expandable styrene polymer (EPS), by way of example comprising the following steps:

a) mixing to incorporate an organic blowing agent and one or more compounds of the formula (I) and optionally further auxiliaries and additives into a styrene polymer melt by means of static and/or dynamic mixers at a temperature of at least 150° C.,
b) cooling of the styrene polymer melt comprising blowing agent to a temperature of at least 120° C.,
c) discharge through a die plate with holes, the diameter of which at the exit from the die is at most 1.5 mm, and
d) pelletization of the melt comprising blowing agent directly behind the die plate under water at a pressure in the range from 1 to 20 bar.

Likewise preferred is a process for the production of an expandable styrene polymer of the invention, comprising the following steps:

a) polymerization of one or more styrene monomers in suspension;
b) addition of one or more compounds of the formula (I) and also optionally of further auxiliaries and additives before, during and/or after the polymerization;
c) addition of an organic blowing agent before, during and/or after the polymerization; and
d) separation of the expandable styrene polymer particles, comprising one or more compounds of the formula (I), from the suspension.

The invention further provides a process for the production of an extruded styrene foam (XPS) comprising the following steps:

a) heating of a polymer component P which comprises at least one polystyrene polymer, to form a polymer melt,
b) introduction of a blowing agent component T into the polymer melt to form a foamable melt,
c) extrusion of the foamable melt into a region of relatively low pressure with foaming to give an extruded foam, and
d) addition of at least one compound of the formula (I) as flame retardant, and also, optionally, of further auxiliaries and additives, in at least one of the steps a) and b).

The compounds of the formula (I) are halogen-free and, even when amounts are small, are markedly more effective flame retardants, particularly in foams, than the flame retardants known from the prior art, such as Disflamoll TP® (triphenyl phosphate (O)P(OPh)$_3$ or dibenz[c,e][1,2]-oxaphosphorine 6-oxide (DOPO, EP-A 1 791 896).

The definitions of the symbols in the formula (I) are preferably as follows:

A is preferably a group of the formula (II), (III), or (IV).

Y is preferably $(X^2)_rPR^3R^4$, or H.

$R^1$, $R^2$, $R^3$, and $R^4$, being identical or different, are preferably $C_6$-$C_{10}$-aryl, $C_6$-$C_{10}$-aryloxy, $C_6$-$C_{10}$-aryl-$C_1$-$C_{16}$-alkyl, or $C_6$-$C_{10}$-aryl-$C_1$-$C_{16}$-alkoxy.

$R^5$, $R^6$, $R^7$, and $R^8$ are preferably H, $C_1$-$C_{16}$-alkyl, $C_2$-$C_{16}$-alkenyl, $C_1$-$C_{16}$-alkoxy or $C_2$-$C_{16}$-alkenoxy. They are identical or different, preferably identical.

$X^1$ and $X^2$, being identical or different, are preferably S or O.

r and s are preferably identically 0 or 1.

$X^3$, $X^4$, $X^5$, and $X^6$ are preferably O.

n is preferably a natural number from 1 to 30.

Preference is given to compounds of the formula (I) in which the preferred definitions apply to all of the symbols.

The definitions of the symbols in the formula (I) are particularly preferably as follows:

A is particularly preferably a group of the formula (II), (III), or (IV).

Y is particularly preferably $(X^2)_rPR^3R^4$.

$R^1$, $R^2$, $R^3$, and $R^4$, being identical or different, are particularly preferably phenyl, phenoxy, phenyl-$C_1$-$C_{16}$-alkyl, or phenyl-$C_1$-$C_{16}$-alkoxy.

$R^5$, $R^6$, $R^7$, and $R^8$ are particularly preferably H.

$X^1$ and $X^2$, being identical or different, are particularly preferably S or O.

r and s are particularly preferably identically 0 or 1.

$X^3$, $X^4$, $X^5$, and $X^6$ are particularly preferably O.

n is particularly preferably 1.

Particular preference is given to compounds of the formula (I) in which the particularly preferred definitions apply to all of the symbols and indices.

Preference is given to compounds of the formula (I) in which $R^1$ and $R^2$ are identical.

Preference is further given to compounds of the formula (I) in which $R^1$ and $R^3$ or $R^1$ and $R^4$ are identical. Particular preference is further given to compounds of the formula (I) in which $R^2$ and $R^3$ or $R^2$ and $R^4$ are identical.

Further preference is given to compounds in which $R^1$, $R^2$, $R^3$ and $R^4$ are identical.

It is in particular preferable that the definitions of the symbols and indices in formula (I) are as follows:

A is in particular preferably a group of the formula (II), (III), or (IV).

Y is in particular preferably $(X^2)_rPR^3R^4$.

$R^1$, $R^2$, $R^3$, and $R^4$ are in particular preferably identically phenyl or phenoxy.

$R^5$, $R^6$, $R^7$, and $R^8$ are in particular preferably H.

$X^1$ and $X^2$ are in particular preferably identically S or O.

r and s are in particular preferably identically 0 or 1.

$X^3$, $X^4$, $X^5$, and $X^6$ are in particular preferably oxygen.

n is in particular preferably 1.

Preference is in particular given to compounds of the formula (I) in which the definitions that are in particular preferred apply to all of the symbols and indices.

Preference is given to the compounds of the formula (I) in which respectively two of the radicals $R^1$, $R^2$, $R^3$, and $R^4$ form, together with the phosphorus atom to which they are bonded, or with the P—O-A-O—P— group, a three- to twelve-membered ring system.

Preference is further given to compounds of the formula (I) in which two radicals $R^1$, $R^2$, $R^3$, and $R^4$ together do not form a ring system.

The following compounds are in particular preferred:

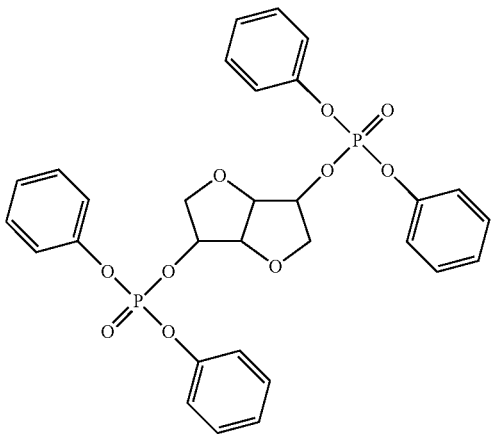

II.1

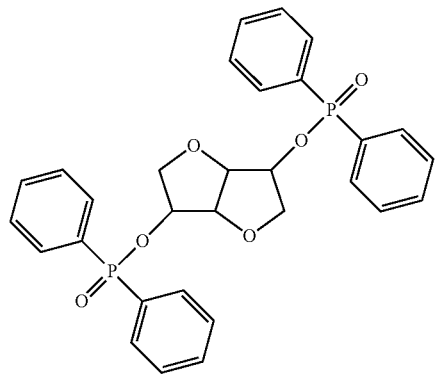

II.2

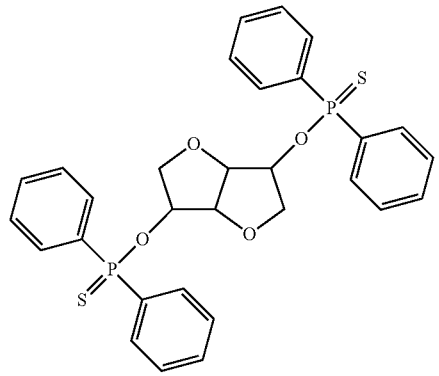

II.3

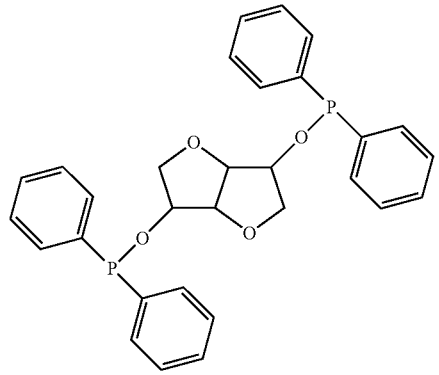

II.4

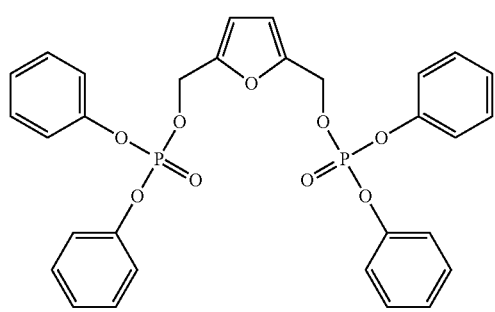
III.1
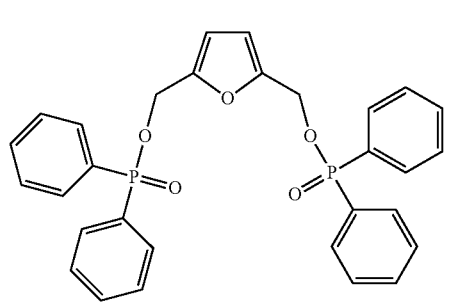
III.2
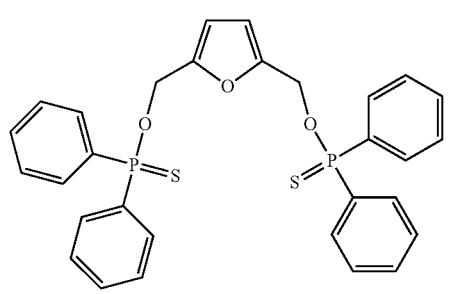
III.3
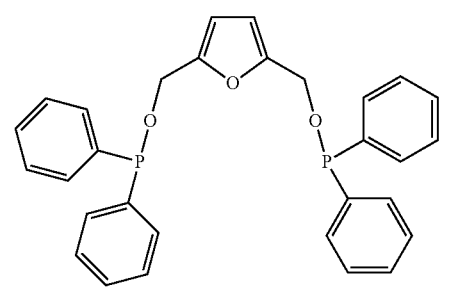
III.4
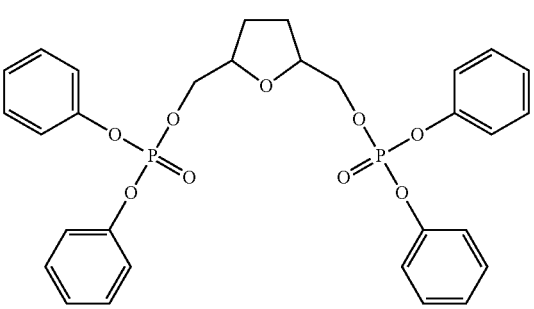
IV.1
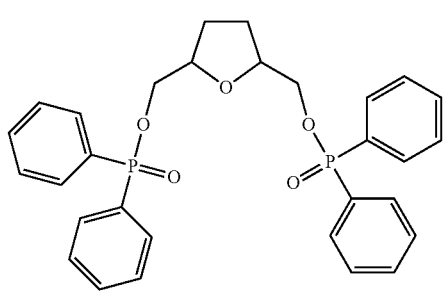
IV.2
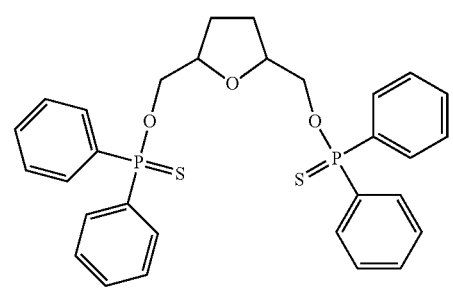
IV.3
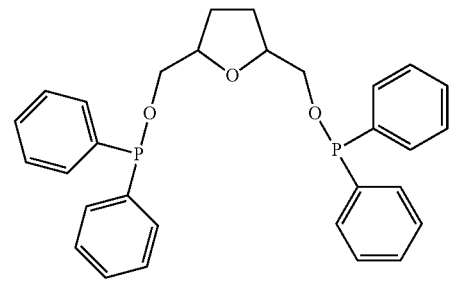
IV.4
An example of a synthesis of the phosphorylated furan- or thiophene-based diols (I) that are effective as flame retardant agonists is achieved via reaction of the corresponding furan- or thiophene-based parent diol systems (II' to IV')
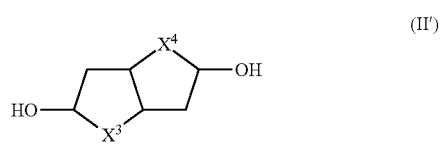
(II')
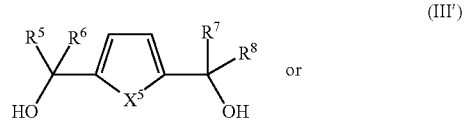
(III')
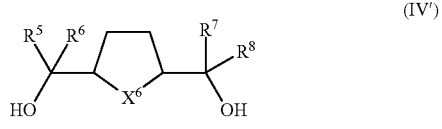
(IV')

with the chlorophosphorus compounds (V)

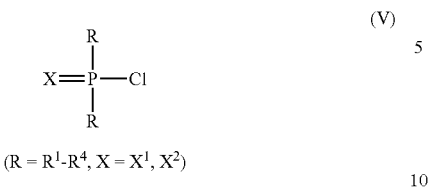

$(R = R^1\text{-}R^4, X = X^1, X^2)$ in the presence of a base. The underlying type of reaction here, the reaction of chlorophosphorus compounds with alcohols, is well known from the literature [see, for example, WO-A 2003/062251; Dhawan, Balram; Redmore, Derek, J. Org. Chem. (1986), 51(2), 179-83; WO 96/17853; Kumar, K. Ananda; Kasthuraiah, M.; Reddy, C. Suresh; Nagaraju, C, Heterocyclic Communications (2003), 9(3), 313-318; Givelet, Cecile; Tinant, Bernard; Van Meervelt, Luc; Buffeteau, Thierry; Marchand-Geneste, Nathalie; Bibal, Brigitte. J. Org. Chem. (2009), 74(2), 652-659.]

Most of the furan- or thiophene-based parent diol systems are commercially available or can easily be prepared by methods known from the literature, starting from sugars [see, for example: WO 2006/063287 (preparation of 2,5-bis(hydroxymethyl)tetrahydrofuran); Cottier, Louis; Descotes, Gerard; Soro, Yaya. Synth. Comm. (2003), 33(24), 4285-4295), preparation of 2,5-bis(hydroxymethyl)furan);

CA 2196632, Katritzky, Alan R.; Zhang, Zhongxing; Lang, Hengyuan; Jubran, Nusrallah; Leichter, Louis M.; Sweeny, Norman. J. Heterocycl. Chem. (1997), 34(2), 561-565].

The preparation of 2,5-substituted furan-based derivatives is also well known from the literature ($R^5$-$R^8$ being entirely or to some extent identical or different and not equal to H):

- e.g. the preparation of α2,α5-arylated 2,5-bis(hydroxymethyl)furans: Ishii, Akihiko; Horikawa, Yasuaki; Takaki, Ikuo; Shibata, Jun; Nakayama, Juzo; Hoshino, Masamatsu, Tetrahedron Lett. (1991), 32(34), 4313-16; Jang, Yong-Sung; Kim, Han-Je; Lee, Phil-Ho; Lee, Chang-Hee. Tetrahedron Lett. (2000), 41(16), 2919-2923, or
- e.g. the preparation of α2,α5-alkylated 2,5-bis(hydroxymethyl)furans: Krauss, Juergen; Unterreitmeier, Doris; Antlsperger, Dorothee, Archiv der Pharmazie, (2003), 336(8), 381-384, e.g. the preparation of α2,α5-alkylated 2,5-bis(hydroxymethyl)tetrahydrofurans: Walba, D. M.; Wand, M. D.; Wilkes, M. C., J. Am. Chem. Soc., (1979), 101(15), 4396-4397, or
- e.g. the preparation of α2,α5-alkenylated 2,5-bis(hydroxymethyl)tetrahydrofurans: Morimoto, Yoshiki; Kinoshita, Takamasa; Iwai, Toshiyuki, Chirality (2002), 14(7), 578-586.

The synthesis of asymmetrically 2,5-substituted furan-based diols of this type is also known from the literature, e.g. the preparation of α2-alkylated 2,5-bis(hydroxymethyl)tetrahydrofurans: Donohoe, Timothy J.; Williams, Oliver; Churchill, Gwydian H, Angew. Chem. Int. Ed. (2008), 47(15), 2869-2871; or the synthesis of α2-alkylated, α5 alkynylated 2,5-bis(hydroxymethyl)tetrahydrofurans: Abe, Masato; Kubo, Akina; Yamamoto, Shuhei; Hatoh, Yoshinori; Murai, Masatoshi; Hattori, Yasunao; Makabe, Hidefumi; Nishioka, Takaaki; Miyoshi, Hideto. Biochemistry (2008), 47(23), 6260-6266;

or the preparation of α2-alkoxylated 2,5-bis(hydroxymethyl)furans: Lu, Dan; Li, Pingya; Liu, Jinping; Li, Haijun, CN 101544624 A.

The synthesis of the thioanalogs (X=S) of (II) is also known from the literature [cf. Kuszmann, J.; Sohar, P., Carbohydrate Research (1972), 21(1), 19-27].

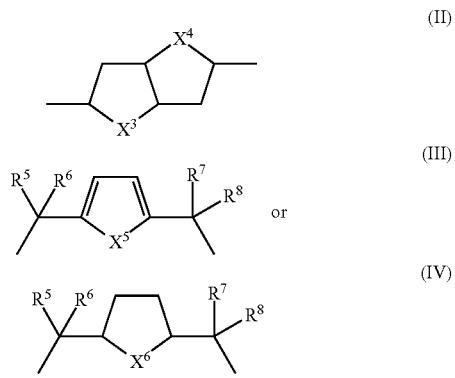

The synthesis of the thioanalogs (X=S) of (III) [cf. Garrigues, Bernard., Phosph., Sulfur and Silicon (1990), 53(1-4), 75-9] and of substituted thioanalogs of (III), e.g. α2,α5-arylated 2,5-bis(hydroxymethyl)thiophenes [Kumaresan, D.; Agarwal, Neeraj; Gupta, Iti; Ravikanth, M. Tetrahedron (2002), 58(26), 5347-5356] is likewise known.

The synthesis of the thioanalogs (X=S) of (IV) and substituted thioanalogs of (IV), e.g. α2,α5-alkylated 2,5-bis(hydroxymethyl)tetrahydrothiophenes has moreover been described [cf. Luttringhaus, A.; Merz, H. Archiv der Pharmazie and Berichte der Deutschen Pharmazeutischen Gesellschaft [Archive of pharmacy and reports of the German Pharmaceutical Society] (1960), 293 881-890 and, respectively, Block, Eric; Ahmad, Saleem. Phosph. Sulfur and the Related Elements (1985), 25(2), 139-145].

Some of the furan- or thiophene-based diols occur in enantiomerically or diastereomerically pure form. The furan- or thiophene-based diols can be used in the form of their pure enantiomers or diastereomers. However, preference is given to mixtures of the respective geometric isomers.

The chlorophosphorus derivatives of the formula (V) suitable for the synthesis of the flame retardant agonists

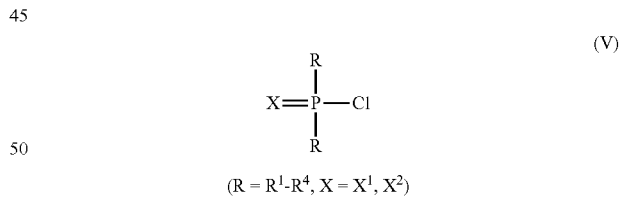

$(R = R^1\text{-}R^4, X = X^1, X^2)$ are usually available commercially or can be prepared by way of synthesis routes well known from the literature [cf. Science of Synthesis (former Houben Weyl) 42 (2008); Houben Weyl E1-2 (1982); Houben Weyl 12 (1963-1964)]. Explicit examples that may be mentioned are:

chlorodiphenylphosphine (X=I; R1=R2=Ph), [cf. Sun, Dengli; Wang, Chunyu; Gong, Shengming; Sun, Shengwen. CN 101481390 A 20090715];

diphenylphosphinyl chloride (X=O; R1=R2=Ph), [cf. Caminade, Anne Marie; El Khatib, Fayez; Baceiredo, Antoine; Koenig, Max. Phosphorus and Sulfur and the Related Elements (1987), 29(2-4), 365-7.];

diphenylthiophosphinyl chloride (X=S; R1=R2=Ph), [cf. Hodgson, Linda M.; Platel, Rachel H.; White, Andrew J.

P.; Williams, Charlotte K. Macromolecules (Washington, D.C., United States) (2008), 41(22), 8603-8607.];
diphenyl chlorophosphate (X=O; R1=R2=OPh), [cf. Fadeicheva, A. G.; Rudenko, L. G.; Skuratovskaya, T. N. Metody Polucheniya Khimicheskikh Reaktivov i Preparatov (1969), No. 18 207-9.].

Suitable solvents are inert organic solvents, e.g. DMSO, halogenated hydrocarbons, e.g. methylene chloride, chloroform, 1,2-dichloroethane, and chlorobenzene. Solvents with further suitability are ethers, e.g. diethyl ether, methyl tert-butyl ether, dibutyl ether, dioxane, or tetrahydrofuran. Solvents with further suitability are hydrocarbons, e.g. hexane, benzene, or toluene. Solvents with further suitability are nitriles, e.g. acetonitrile or propionitrile. Solvents with further suitability are ketones, e.g. acetone, butanone, or tert-butyl methyl ketone.

It is also possible to use mixtures of the solvents.

Suitable bases are metal hydrides, e.g. sodium hydride, or non-nucleophilic amine bases, e.g. triethylamine, Hünig's base, bicyclic amines, such as 1,8-diazabicyclo[5.4.0]undec-7-ene (DBU), N-methylimidazole, and N-methylmorpholine, N-methylpiperidine, pyridine and substituted pyridines, such as lutidine. Particular preference is given to triethylamine and N-methylimidazole.

The amounts used of the bases are generally equimolar. However, they can also be used in excess or optionally as solvents.

The amounts reacted of the starting materials are generally stoichiometric in a ratio of 1:2 (diol: chlorophosphorus component). It can be advantageous to use the chlorophosphorus component in an excess in relation to the hydroxy functionalities of the diol. Use of a substoichiometric amount of the chlorophosphorus component can achieve random partial phosphorylation.

Selective monophosphorylation is achieved via protection of one of the two diol hydroxy groups with the aid of a suitable protective group, the protection of which is in turn removed after the phosphorylation sequence has been successfully carried out. Examples of suitable protective groups are silyl ether protective groups (TMS, TPDMS) and methoxymethyl ether (MOM). The use of protective groups is well known from the relevant literature [cf. Peter G. M. Wuts, Theodora W. Greene in: Greene's Protective Groups in Organic Synthesis, 4th Edition, VCH Wiley 2006].

The heteroatom X can, as described, be introduced directly via coupling of the respective chlorophosphorus component. A second possibility is the coupling of a trivalent phosphorus species to the hydroxy functionality and subsequent oxidation to introduce the heteroelement X, using oxidizing or sulfidizing reagents [cf. Grachev, M. K.; Anfilov, K. L.; Bekker, A. K.; Nifant'ev. E. E. Zhurnal Obshchei Khimii (1995), 65(12), 1946-50].

The reactions are usually carried out at temperatures of from 0° C. to the boiling point of the reaction mixture, preferably from 0° C. to 110° C., particularly preferably from room temperature to 110° C.

The reaction mixtures are worked up conventionally, e.g. via filtration, mixing with water, separation of the phases and optionally chromatographic purification of the crude products. Some of the products occur in the form of highly viscous oils, which are freed from volatile content or purified at reduced pressure and slightly elevated temperature. If the products are obtained in the form of solids, they can also be purified by recrystallization or digestion.

The yield of the isolated products is usually from 40 to 100%, preferably from 90 to 100%.

It is preferable that one compound of the formula (I) is used as flame retardant.

Preference is further given to use of a mixture of at least two, particularly preferably from two to four, with particular preference two, compounds of the formula (I) as flame retardant.

The amounts used of the compounds of the formula (I) used in the invention are generally in the range from 0.1 to 25% by weight, based on the material to be protected, in particular polymer material. Amounts of from 2 to 15% by weight, based on the polymer, in particular provide adequate flame retardancy in foams made of expandable polystyrene.

The effectiveness of the compounds (I) can be still further improved via addition of suitable flame retardant synergists, in particular thermal free-radical generators, preferably organic peroxides, such as dicumyl peroxide or di-tert-butyl peroxide, organic polysulfides, i.e. sulfides having a chain made of three or more sulfur atoms, or carbon-carbon-cleaving initiators, such as biscumyl (2,3-diphenyl-2,3-dimethylbutane). In this case it is usual to use, in addition to the compound(s) (I), from 0.05 to 5% by weight of the flame retardant synergist, based on the material to be protected, in particular polymer material.

Preference is likewise given, as synergist, to elemental sulfur, the proportion of which is preferably from 0.05 to 4% by weight, particularly preferably from 0.1 to 2.5% by weight (based on the material to be protected, in particular polymer material).

The elemental sulfur can also be used in the form of starting compounds which, under the conditions of the process, decompose to give elemental sulfur.

A further possibility is to use elemental sulfur in encapsulated form. Examples of suitable encapsulation materials are melamine resins (by analogy with U.S. Pat. No. 4,440,880) and urea-formaldehyde resin (by analogy with U.S. Pat. No. 4,698,215). WO 99/10429 reveals further materials and references.

One preferred embodiment is therefore also a use of the invention, the compound(s) of the formula (I) being used as a mixture with one or more further flame-retardant compounds and/or one or more synergists.

Additional use can also be made of further flame-retardant materials, such as melamine, melamine cyanurates, metal oxides, metal hydroxides, phosphates, phosphinates and expandable graphite, or synergists, such as $Sb_2O_3$, or Zn compounds. Suitable additional halogen-free flame-retardant materials are obtainable by way of example commercially as Exolit OP 930, Exolit OP 1312, DOPO, HCA-HQ, M-Ester Cyagard RF-1241, Cyagard RF-1243, Fyrol PMP, Phoslite IP-A (aluminum hypophosphite), Melapur 200, or Melapur MC, APP (ammonium polyphosphate).

If complete freedom from halogen is not necessary, reduced-halogen-content materials can be produced by using the compounds (I) of the invention and adding relatively small amounts of halogen-containing, in particular brominated, flame retardants, such as hexabromocyclododecane (HBCD), the amounts of which are preferably in the range from 0.05 to 1% by weight, in particular from 0.1 to 0.5% by weight (based on the material to be protected, in particular the polymer composition).

In one preferred embodiment, the flame retardant of the invention is halogen-free.

The composition made of the material to be protected, and of flame retardant and of further additives is particularly preferably halogen-free.

The material to be protected is preferably a polymer composition, i.e. a composition which comprises one or more polymers and is preferably composed of one or more polymers. Preference is given to thermoplastic polymers. The polymer material is particularly preferably a foam.

The flame retardants of the invention, i.e. compounds of the formula (I), are used in the invention, alone or in a mixture with one another, and/or with synergists, and/or with further flame-retardant substances, for the production of flame-retardant polymers, in particular thermoplastic polymers. To this end, the flame retardants are preferably physically mixed with the corresponding polymer in the melt and then first subjected to a complete compounding process in the form of polymer mixture with phosphorus contents of from 0.05% by weight to 5% by weight (based on the polymer), and then, in a second step of the process, further processed with the same or another polymer. Alternatively, in the case of styrene polymers, the addition of the compounds (I) of the invention before, during and/or after the preparation by suspension polymerization is also preferred.

The invention also provides a, preferably thermoplastic, polymer composition comprising one or more compounds of the formula (I) as flame retardant.

Examples of polymers that can be used are foamed or unfoamed styrene polymers, including ABS, ASA, SAN, AMSAN, SB, and HIPS polymers, polyimides, polysulfones, polyolefins, such as polyethylene and polypropylene, polyacrylates, polyether ether ketones, polyurethanes, polycarbonates, polyphenylene oxides, unsaturated polyester resins, phenolic resins, polyamides, polyether sulfones, polyether ketones, and polyether sulfides, in each case individually or in a mixture in the form of polymer blends.

Preference is given to thermoplastic polymers, such as foamed or unfoamed styrene homo- and copolymers, in each case individually or in a mixture in the form of polymer blends.

Preference is given to flame-retardant polymer foams, in particular those based on styrene polymers, preferably EPS and XPS.

The density of the flame-retardant polymer foams is preferably in the range from 5 to 200 kg/m$^3$, particularly preferably in the range from 10 to 50 kg/m$^3$, and their closed cell content is preferably more than 80%, particularly preferably from 90 to 100%.

The flame-retardant, expandable styrene polymers (EPS) and extruded styrene polymer foams (XPS) of the invention can be processed via addition of the blowing agent and of the flame retardant of the invention before, during or after the suspension polymerization or via mixing to incorporate a blowing agent and the flame retardant of the invention into the polymer melt and then extrusion and pelletization under pressure to give expandable pellets (EPS), or via extrusion and depressurization, using appropriately shaped dies, to give foam sheets (XPS) or foam extrudates.

The term styrene polymer in the invention comprises polymers based on styrene, alpha-methylstyrene, or a mixture of styrene and alpha-methylstyrene; this applies analogously to the styrene content in SAN, AMSAN, ABS, ASA, MBS, and MABS (see below). Styrene polymers of the invention are based on at least 50% by weight of styrene and/or alpha-methylstrene monomers.

In one preferred embodiment, the polymer is an expandable polystyrene (EPS).

In another preferred embodiment, the foam is an extruded styrene polymer foam (XPS).

The molar mass $M_w$ of expandable styrene polymers is preferably in the range from 120 000 to 400 000 g/mol, particularly preferably in the range from 180 000 to 300 000 g/mol, measured by means of gel permeation chromatography with refractiometric detection (RI) against polystyrene standards. The molar mass of the expandable polystyrene is generally below the molar mass of the polystyrene used by about 10 000 g/mol, because of the molar mass degradation due to shear and/or the effect of temperature.

Styrene polymers preferably used comprise glassclear polystyrene (GPPS), high-impact polystyrene (HIPS), anionically polymerized polystyrene or high-impact polystyrene (AIPS), styrene-alpha-methylstyrene copolymers, acrylonitrile-butadiene-styrene polymers (ABS), styrene-butadiene copolymers (SB), styrene-acrylonitrile copolymers (SAN), acrylonitrile-alpha-methylstyrene copolymers (AMSAN), acrylonitrile-styrene-acrylate (ASA), methyl methacrylate-butadiene-styrene (MBS), methyl methacrylate-acrylonitrile-butadiene-styrene (MABS) polymers, or a mixture thereof, or a mixture with polyphenylene ether (PPE).

In order to improve mechanical properties or thermal stability, the styrene polymers mentioned may be blended with thermoplastic polymers, such as polyamides (PAs), polyolefins, such as polypropylene (PP) or polyethylene (PE), polyacrylates, such as polymethyl methacrylate (PMMA), polycarbonate (PC), polyesters, such as polyethylene terephthalate (PET) or polybutylene terephthalate (PBT), polyether sulfones (PES), polyether ketones or polyether sulfides (PES) or mixtures of these, generally in total proportions of up to a maximum of 30% by weight, preferably in the range from 1 to 10% by weight, based on the polymer melt, optionally with use of compatibilizers. Mixtures within the ranges of amounts mentioned are also possible with, by way of example, hydrophobically modified or functionalized polymers or oligomers, rubbers, such as polyacrylates or polydienes, e.g. styrene-butadiene block copolymers, or biodegradable aliphatic or aliphatic/aromatic copolyesters.

Examples of suitable compatibilizers are maleic-anhydride-modified styrene copolymers, polymers containing epoxy groups, and organosilanes.

The styrene polymer melt can also receive admixtures of polymer recyclates derived from the thermoplastic polymers mentioned, in particular additions of styrene polymers and of expandable styrene polymers (EPS), in amounts which do not substantially impair their properties, the amounts generally being at most 50% by weight, in particular from 1 to 20% by weight.

The styrene polymer melt comprising blowing agent generally comprises one or more blowing agents homogeneously distributed in a total proportion of from 2 to 10% by weight, preferably from 3 to 7% by weight, based on the styrene polymer melt comprising blowing agent. Suitable blowing agents are the physical blowing agents usually used in EPS, such as aliphatic hydrocarbons having from 2 to 7 carbon atoms, alcohols, ketones, ethers, or halogenated hydrocarbons. Preference is given to use of isobutane, n-butane, isopentane, n-pentane. For XPS, it is preferable to use $CO_2$ or a mixture thereof with alcohols and/or with $C_2$-$C_4$ carbonyl compounds, in particular with ketones.

To improve foamability, finely dispersed droplets of internal water may be introduced into the styrene polymer matrix. An example of the method for this is the addition of water into the molten styrene polymer matrix. The location of addition of the water may be upstream of, together with, or downstream of, the blowing agent feed. Homogeneous distribution of the water may be achieved by using dynamic or static mixers. An adequate amount of water, based on the styrene polymer, is generally from 0 to 2% by weight, preferably from 0.05 to 1.5% by weight.

Expandable styrene polymers (EPSs) with at least 90% of the internal water in the form of droplets of internal water with diameter in the range from 0.5 to 15 μm form, on foaming, foams with an adequate number of cells and with homogeneous foam structure.

The amount added of blowing agent and of water is selected in such a way that the expansion capability α of the expandable styrene polymers (EPSs), defined as bulk density prior to foaming/bulk density after foaming, is at most 125, preferably from 15 to 100.

The bulk density of the expandable styrene polymer pellets (EPSs) of the invention is generally at most 700 g/l, preferably in the range from 590 to 660 g/l. If fillers are used, bulk densities in the range from 590 to 1200 g/l may arise, depending on the nature and amount of the filler.

Additives, nucleating agents, fillers, plasticizers, soluble and insoluble inorganic and/or organic dyes and pigments, e.g. IR absorbers, such as carbon black, graphite or aluminum powder may moreover be added, together or with spatial separation, to the styrene polymer melt, e.g. by way of mixers or ancillary extruders. The amounts added of the dyes and pigments are generally in the range from 0.01 to 30% by weight, preferably in the range from 1 to 5% by weight. For homogeneous and microdisperse distribution of the pigments within the styrene polymer, it can be advantageous, particularly in the case of polar pigments, to use a dispersing agent, e.g. organosilanes, polymers containing epoxy groups, or maleic-anhydride-grafted styrene polymers. Preferred plasticizers are mineral oils, phthalates, which may be used in amounts of from 0.05 to 10% by weight, based on the styrene polymer. Analogously, these substances can also be added before, during or after the suspension polymerization to EPS of the invention.

To produce the expandable styrene polymers of the invention, after the granulation process, the blowing agent can be incorporated by mixing into the polymer melt. One possible process comprises the following stages: a) melt production, b) mixing, c) cooling, d) transport, and e) pelletizing. Each of these stages may be executed using the apparatus or combinations of apparatus known from plastics processing. Static or dynamic mixers, such as extruders, are suitable for this mixing process. The polymer melt may be taken directly from a polymerization reactor, or produced directly in the mixing extruder, or in a separate melting extruder via melting of polymer pellets. The cooling of the melt may take place in the mixing assemblies or in separate coolers. Examples of pelletizers which may be used are pressurized underwater pelletizers, a pelletizer with rotating knives and cooling via spray-misting of temperature-control liquids, or pelletizers involving atomization. Examples of suitable arrangements of apparatus for carrying out the process are:
  a) polymerization reactor—static mixer/cooler—pelletizer
  b) polymerization reactor—extruder—pelletizer
  c) extruder—static mixer—pelletizer
  d) extruder—pelletizer The arrangement may also have ancillary extruders for introducing additives, e.g. solids or heat-sensitive additives.

The temperature of the styrene polymer melt comprising blowing agent when it is passed through the die plate is generally in the range from 140 to 300° C., preferably in the range from 160 to 240° C. Cooling to the region of the glass transition temperature is not necessary.

The die plate is heated at least to the temperature of the polystyrene melt comprising blowing agent. The temperature of the die plate is preferably above the temperature of the polystyrene melt comprising blowing agent by from 20 to 100° C. This avoids polymer deposits in the dies and ensures problem-free pelletization.

In order to obtain marketable pellet sizes, the diameter (D) of the die holes at the exit from the die should be in the range from 0.2 to 1.5 mm, preferably in the range from 0.3 to 1.2 mm, particularly preferably in the range from 0.3 to 0.8 mm. This permits controlled setting of pellet sizes below 2 mm, in particular in the range from 0.4 to 1.4 mm, even after die swell.

Particular preference is given to a process which comprises the following steps for the production of expandable styrene polymers (EPS) rendered flame-retardant by a halogen-free method:
  a) mixing to incorporate an organic blowing agent and from 1 to 25% by weight of the flame retardant of the invention into the polymer melt by means of a static or dynamic mixer at a temperature of at least 150° C.,
  b) cooling of the styrene polymer melt comprising blowing agent to a temperature of at least 120° C.,
  c) discharge through a die plate with holes, the diameter of which at the exit from the die is at most 1.5 mm, and
  d) pelletization of the melt comprising blowing agent directly behind the die plate under water at a pressure in the range from 1 to 20 bar.

It is also preferable to produce the expandable styrene polymers (EPS) of the invention via suspension polymerization in aqueous suspension in the presence of the flame retardant of the invention and of an organic blowing agent.

In the suspension polymerization process, it is preferable to use styrene alone as monomer. However, up to 20% of its weight can have been replaced by other ethylenically unsaturated monomers, such as alkylstyrenes, divinylbenzene, acrylonitrile, 1,1-diphenyl ether or α-methylstyrene.

The usual auxiliaries can be added during the suspension polymerization process, examples being peroxide initiators, suspension stabilizers, blowing agents, chain-transfer agents, expansion aids, nucleating agents, and plasticizers. The amounts of flame retardant of the invention added in the polymerization process are from 0.5 to 25% by weight, preferably from 5 to 15% by weight. The amounts of blowing agents added are from 2 to 10% by weight, based on monomer. These amounts can be added prior to, during, or after polymerization of the suspension. Examples of suitable blowing agents are aliphatic hydrocarbons having from 4 to 6 carbon atoms. It is advantageous to use inorganic Pickering dispersants as suspension stabilizers, an example being magnesium pyrophosphate or calcium phosphate.

The suspension polymerization process produces bead-shaped particles which are in essence round, with average diameter in the range from 0.2 to 2 mm.

In order to improve processability, the finished expandable styrene polymer pellets can be coated with glycerol ester, antistatic agent, or anticaking agent.

The EPS pellets can be coated with glycerol monostearate GMS (typically 0.25%), glycerol tristearate (typically 0.25%), Aerosil R972 fine-particle silica (typically 0.12%), or Zn stearate (typically 0.15%), or else antistatic agent.

The expandable styrene polymer pellets of the invention can be prefoamed in a first step by means of hot air or steam to give foam beads with density in the range from 5 to 200 kg/m$^3$, in particular from 10 to 50 kg/m$^3$, and can be fused in a second step in a closed mold, to give molded foams.

The expandable polystyrene particles can be processed to give polystyrene foams with densities of from 8 to 200 kg/m$^3$, preferably from 10 to 50 kg/m$^3$. To this end, the expandable beads are prefoamed. This is mostly achieved by heating of the beads, using steam in what are known as prefoamers. The resultant prefoamed beads are then fused to give moldings. To this end, the prefoamed beads are introduced into molds which do not have a gas-tight seal, and are treated with steam. The moldings can be removed after the cooling.

In another preferred embodiment, the foam is an extruded polystyrene (XPS), obtainable via:
a) heating of a polymer component P to form a polymer melt,
b) introduction of a blowing agent component T into the polymer melt to form a foamable melt,
c) extrusion of the foamable melt into a region of relatively low pressure with foaming to give an extruded foam, and
d) addition of the flame retardant of the invention and also optionally of further auxiliaries and additives, in at least one of the steps a) and/or b).

Foams of the invention based on styrene polymers, in particular EPS and XPS, are suitable by way of example for use as insulation materials, in particular in the construction industry. A preferred use is as halogen-free insulation material, in particular in the construction industry.

The extinguishment time (DIN 4102 B2 fire test for foam density 15 g/l and aging time 72 h) of foams of the invention, in particular those based on styrene polymers, such as EPS and XPS, is preferably ≤15 sec, particularly preferably ≤10 sec, and they thus satisfy the conditions for passing said fire test, as long as the flame height does not exceed the test level stated in the standard.

The examples below provide further explanation of the invention, but with no restriction.

EXAMPLES

A. Synthesis Examples

General Specification for Synthesizing the Phosphorus-Containing Esters:

The furan-based diol (2 mol) in toluene (2000 mL) and triethylamine (5 mol) are introduced at RT (room temperature) into a standard stirred 4 L apparatus. The respective chlorophosphorus component (4 mol) is added dropwise within a period of 5 h at from RT to 50° C. Stirring of the mixture is continued at RT overnight. Control of the reaction via $^{31}$P NMR indicates quantitative conversion. In the event of incomplete conversion, the reaction time is increased.

The precipitated triethylammonium chloride is then removed by filtration, and the filtercake is then washed with toluene (1×300 mL). The filtrate is vigorously shaken with saturated, aqueous $Na_2CO_3$ solution (2×500 mL) for extraction purposes and then washed with water (2×500 mL) and dried over $Na_2SO_4$. The $Na_2SO_4$ is removed by suction filtration and then washed with toluene (1×300 mL). The filtrate is concentrated in vacuo (65° C., 77 mbar) on a rotary evaporator and then dried in the vacuum provided by an oil pump for 4 h at 80° C. in order to obtain the respective product in the form of residue in yields of from 75 to 99%.

A.1 Synthesis of Isosorbide bis(diphenyl phosphate) (II.1)

Apparatus
Stirred 4000 ml apparatus, argon inertization
Mixture:
298.2 g (2.0 mol) of isosorbide 98%
506 g (5.0 mol) of triethylamine
2000 mL of toluene
1120 g (4.0 mol) of chlorodiphenyl phosphate 96%

Isosorbide (298.2 g, 2 mol) in toluene (2000 mL) and triethylamine (506 g, 5.0 mol) were introduced at room temperature (RT) into a standard stirred 4 L apparatus. Chlorodiphenyl phosphate (1120 g, 4.0 mol) was added dropwise within a period of 5 h at from 22 to 42° C. Stirring of the cloudy yellow mixture was continued at RT overnight. Control of the reaction via $^{31}$P NMR indicated qualitative conversion.

The precipitated triethylammonium chloride was removed by filtration and then washed with toluene (1×300 mL). The filtrate was vigorously shaken with saturated, aqueous $Na_2CO_3$ solution (2×500 mL) for extraction purposes and then washed with water (2×500 mL) and dried over $Na_2SO_4$ overnight. The $Na_2SO_4$ was removed by suction filtration and then washed with toluene (1×300 mL). The filtrate was concentrated in vacuo (65° C., 77 mbar) on a rotary evaporator and then dried in the vacuum provided by an oil pump for 4 h at 80° C.

The product was obtained in the form of a red-brown oil (1046 g, 86% of theory), purity >96% (based on P NMR).

The pH of an aqueous emulsion of the product was 5.0.

Analytical Data:
$^{31}$P-NMR (toluene$_{d8}$), [ppm]: −11.2 (d, $^3J_{P,H}$=7 Hz), −11.9 (d, $^3J_{P,H}$=7 Hz) (2 isomers).

$^1$H-NMR (toluene$_{d8}$), [ppm]: 7.37-7.22 (m, 8H, ar), 7.16-7.00 (m, 8H, ar), 7.00-6.89 (m, 4H, ar), 5.15-5.01 (m, 1H, $CH_{isosorbide}$), 4.95-4.82 (m, 1H, $CH_{isosorbide}$), 4.62-4.52 (m, 1H, $CH_{isosorbide}$), 4.50-4.40 (m, 1H, $CH_{isosorbide}$), 4.08-3.96 (m, 1H, $CH_{isosorbide}$), 3.83-3.71 (m, 1H, $CH_{isosorbide}$), 3.69-3.59 (m, 1H, $CH_{isosorbide}$), 3.59-3.47 (m, 1H, $CH_{isosorbide}$).

The following compounds were obtained by analogous methods:

A.2 Isosorbide O,O'-bis(diphenylphosphinic ester) (II.2)

Analytical Data:
$^1$H NMR (360 MHz, toluene-$d_8$, 300K): =3.62 (dd, 1H, $CH_2$, $^3J$=6.2 Hz, $^2J$=9.2 Hz), 3.69 (dd, 1H, $CH_2$, $^3J$=6.5 Hz, $^2J$=9.3 Hz), 3.77 (dd, 1H, $CH_2$, $^3J$=3.2 Hz, $^2J$=10.6 Hz), 4.17 (d, 1H, $CH_2$, $^2J$=10.6 Hz), 4.46 (d, 1H, $CH_{isosorbide}$, $^3J$=4.4 Hz), 4.52 (d, 1H, $CH_{isosorbide}$, $^3J$=4.4 Hz), 4.60-4.68 (m, $CH_{isosorbide}$), 4.85 (dd, 1H, $CH_{isosorbide}$, $^3J$=3.0 Hz, $^3J$=8.1 Hz), 7.04-7.15 (m, 12H, $CH_{m,p}$), 7.96-8.03 (m, 8H, $CH_o$) ppm.

$^{13}$C NMR (90 MHz, CDCl$_3$, 300K): δ=70.1 (d, $CH_2$, $^3J_{C-P}$=3.7 Hz), 73.7 (d, $CH_{isosorbide}$, $J_{C-P}$=6.0 Hz), 74.0 (d, $CH_2$, $^3J_{C-P}$=3.7 Hz), 78.3 (d, $CH_{isosorbide}$, $J_{C-P}$=5.7 Hz), 80.6 (d, $CH_{isosorbide}$, $J_{C-P}$=4.7 Hz), 85.8 (d, $CH_{isosorbide}$, $J_{C-P}$=5.3 Hz), 127.9 (d, $CH_{m,isomers}$, $^3J_{C-P}$=13.3 Hz), 128.0 (d, $CH_{m,isomers}$, $^3J_{C-P}$=13.0 Hz), 128.0 (d, $CH_{m,isomers}$, $^3J_{C-P}$=13.3 Hz), 128.0 (d, $CH_{m,isomers}$, $^3J_{C-P}$=13.3 Hz), 129.5 (d, $CH_{i,isomers}$, $^1J$=9.3 Hz), 129.7 (d, $CH_{i,isomers}$, $^1J$=25.9 Hz), 130.8 (d, $CH_{o,isomers}$, $^2J$=10.3 Hz), 130.8 (d, 2C, $CH_{o,isomers}$, $^2J_{C-P}$=10.3 Hz), 131.0 (d, $CH_{i,isomers}$, $^1J_{C-P}$=8.0 Hz), 131.2 (d, $CH_{i,isomers}$, $^2J_{C-P}$=10.3 Hz), 131.2 (d, $CH_{i,isomers}$, $^1J_{C-P}$=27.6 Hz), 131.9 (m, 4CH$_{p,isomers}$) ppm.

$^{31}$P NMR (145 MHz, toluene-$d_8$, 300K): δ=26.170 (m), 26.6 (m) ppm.

ESI(+)-HRMS (m/z): calc.: 547.1439 [$C_{30}H_{29}O_6P_2$]$^+$ found: 547.1416 [M+H]$^+$.

Thermogravimetric analysis (TGA) (under argon): 302° C. (2% mass loss), 340° C. (5% mass loss), 358° C. (10% mass loss).

A.3 Isosorbide O,O'-bis(diphenylthiophosphinic ester) (II.3)

Analytical Data:
$^1$H NMR (360 MHz, CDCl$_3$, 300K): =3.68 (dd, 1H, $CH_2$, $^3J$=7.1 Hz, $^2J$=9.2 Hz), 3.82 (dd, 1H, $CH_2$, $^3J$=6.2 Hz, $^2J$=9.2 Hz), 3.96 (dd, 1H, $CH_2$, $^3J$=3.7 Hz, $^2J$=10.6 Hz), 4.11 ("d", 1H, $CH_2$, J=10.6 Hz), 4.55 ("d", $CH_{isosorbide}$, $^3J$=4.7 Hz), 4.71 (t, 1H, $CH_{isosorbide}$, $^3J$=4.6 Hz), 4.97 (m, $CH_{isosorbide}$), 5.10

(dd, 1H, CH$_{isosorbide}$, $^3J$=3.0 Hz, $^3J$=11.8 Hz), 7.35-7.50 (m, 12H, CH$_{m,p}$), 7.78-8.00 (m, 8H, CH$_o$) ppm.

$^{13}$C NMR (90 MHz, CDCl$_3$, 300K): δ=70.3 (d, CH$_2$, $^3J_{C-P}$=4.0 Hz), 74.4 (m, 2C, CH$_2$, CH$_{isosorbide}$), 79.0 (d, CH$_{isosorbide}$, $J_{C-P}$=5.3 Hz), 81.2 (d, CH$_{isosorbide}$, $J_{C-P}$=5.0 Hz), 86.3 (d, CH$_{isosorbide}$, $J_{C-P}$=5.6 Hz), 128.4 (d, 2C, CH$_{m,isomers2}$, $^3J_{C-P}$=13.3 Hz), 128.5 (d, CH$_{m,isomers}$, $^3J_{C-P}$=13.3 Hz), 128.5 (d, CH$_{m,Isomers}$, $^3J_{C-P}$=13.6 Hz), 131.0 (d, CH$_{o,isomers}$, $^2J$=11.6 Hz), 130.0 (d, CH$_{o,isomers}$, $^2J$=11.3 Hz), 131.0 (d, CH$_{o,isomers}$, $^2J$=11.3 Hz), 131.3 (d, CH$_{o,isomers}$, $^2J_{C-P}$=11.6 Hz), 132.0 (m, 4C, CH$_{p,isomers}$), 133.6 (d, CH$_{i,isomers}$, $^1J_{C-P}$=19.9 Hz), 133.7 (d, CH$_{i,isomers}$, $^1J_{C-P}$=2.0 Hz), 134.8 (d, CH$_{i,isomers}$, $^1J_{C-P}$=20.6 Hz), 134.9 (d, CH$_{i,isomers}$, $^1J_{C-P}$=3.0 Hz) ppm.

$^{31}$P NMR (145 MHz, CDCl$_3$, 300K): δ=83.3 (m), 84.8 (m) ppm.

ESI(+)-HRMS (m/z): calc.: 579.0983 [C$_{30}$H$_{29}$O$_4$P$_2$S$_2$]$^+$ found: 579.1016 [M+H]$^+$.

Elemental analysis [%]: calc.: C: 62.3; O: 11.1; S: 11.1; H: 4.9 found: C: 61.1; O: 11.3; S: 11.9; H: 4.8.

TGA (under argon): 293° C. (2% mass loss), 319° C. (5% mass loss), 335° C. (10% mass loss).

A.4 Isosorbide O,O'-bis(diphenylphosphinite) (II.4)

Analytical Data:

$^1$H NMR (360 MHz, toluene-d$_8$, 300K): =3.49 (dd, 1H, CH$_2$, $^3J$=6.2 Hz, $^2J$=9.0 Hz), 3.62 (dd, 1H, CH$_2$, $^3J$=6.7 Hz, $^2J$=9.0 Hz), 3.71 (dd, 1H, CH$_2$, $^3J$=3.2 Hz, $^2J$=10.4 Hz), 3.95 ("d", 1H, CH$_2$, J=10.2 Hz), 4.01-4.09 (m, 1H, CH$_{isosorbide}$), 4.34 (dd, 1H, CH$_{isosorbide}$, $^3J$=0.93 Hz, $^3J$=4.16 Hz), 4.40 (dd, CH$_{isosorbide}$, $^3J$=3.2 Hz, $^3J$=9.3 Hz), 4.49 (t, 1H, CH$_{isosorbide}$, $^3J$=4.6 Hz), 6.99-7.13 (m, 12H, CH$_{m,p}$), 7.42-7.54 (m, 6H, CH$_o$), 7.62-7.67 (m, 2H, CH$_o$) ppm.

$^{13}$C NMR (90 MHz, CDCl$_3$, 300K): δ=71.0 (d, CH$_2$, $^3J_{C-P}$=6.6 Hz), 74.9 (d, CH$_2$, $^3J_{C-P}$=7.0 Hz), 79.7 (d, CHOP, $^2J_{C-P}$=17.6 Hz), 81.4 (d, CHOC, $^3J_{C-P}$=4.0 Hz), 83.6 (d, CHOP, $^2J_{C-P}$=18.6 Hz), 92.0 (d, CHOC, $^2J_{C-P}$=6.3 Hz), 128.2 (d, CH$_{m,isomers}$, $^3J_{C-P}$=7.0 Hz), 128.3 (d, CH$_{m,isomers}$, $^3J_{C-P}$=7.0 Hz), 128.3 (d, CH$_{m,isomers}$, $^3J_{C-P}$=7.0 Hz), 128.4 (d, CH$_{m,isomers}$, $^3J_{C-P}$=7.0 Hz), 129.3 (s, 2C, CH$_p$), 129.5 (s, CH$_p$), 129.53 (s, CH$_p$), 130.1 (d, CH$_{o,isomers}$, $^2J_{C-P}$=21.6 Hz), 130.4 (d, CH$_{o,isomers}$, $^2J_{C-P}$=22.3 Hz), 130.4 (d, CH$_{o,isomers}$, $^2J_{C-P}$=21.9 Hz), 130.5 (d, CH$_{o,isomers}$, $^2J_{C-P}$=21.6 Hz), 141.2 (d, CH$_{i,isomers}$, $^1J_{C-P}$=15.6 Hz), 141.4 (d, CH$_{i,isomers}$, $^1J_{C-P}$=16.3 Hz), 141.5 (d, CH$_{i,isomers}$, $^1J_{C-P}$=15.3 Hz), 141.7 (d, CH$_{i,isomers}$, $^1J_{C-P}$=17.0 Hz) ppm.

$^{31}$P NMR (145 MHz, toluene-d$_8$, 300K): δ=112.2 (sextet, 7.8 Hz), 116.0 (sextet, 8.0 Hz) ppm.

ESI(+)-HRMS (m/z): calc.: 515.1541 [C$_{30}$H$_{29}$O$_4$P$_2$]$^+$ found: 515.1510 [M+H]$^+$.

TGA (under argon): 300° C. (2% mass loss), 322° C. (5% mass loss), 337° C. (10% mass loss).

A.5 Furan-2,5-yldimethyl 2,5-bis(diphenylphosphinic ester) (III.2)

Analytical Data:

$^1$H NMR (500 MHz, toluene-d$_8$, 300K): =4.79 (d, 4H, CH$_2$, $^3J_{P-H}$=8.2 Hz), 5.89 (s, 2H, CH$_{furan}$), 7.01-7.07 (m, 12H, CH$_{m,p}$), 7.82-7.87 (m, 8H, CH$_o$) ppm.

$^{13}$C NMR (125 MHz, toluene-d$_8$, 300K): δ=58.1 (d, CH$_2$, $^2J_{C-P}$=5.2 Hz), 111.6 (s, CH), 128.6 (d, CH$_m$, $^3J_{C-P}$=13.2 Hz), 131.9 (d, CH$_p$, $^4J_{C-P}$=2.9 Hz), 132.1 (d, CH$_o$, $^2J_{C-P}$=9.7 Hz), 133.0 (d, CH$_i$, $^1J_{C-P}$=135.4 Hz) ppm.

$^{31}$P NMR (145 MHz, toluene-d$_8$, 300K): δ=31.2 (m) ppm.

ESI(+)-HRMS (m/z): calc: 529.1334 [C$_{30}$H$_{27}$O$_5$P$_2$]$^+$ found: 529.1328 [M+H]$^+$.

TGA (under argon): 155° C. (2% mass loss), 160° C. (5% mass loss), 200° C. (10% mass loss).

A.6 2,3,4,5-Tetrahydrofuran-2,5-yldimethyl 2,5-bis(diphenyl phosphate) (IV.1)

Analytical Data:

$^1$H NMR (360 MHz, toluene-d$_8$, 300K): =1.29-1.35 (m, 4H, CH$_{2, THF}$), 3.78-3.82 (m, 2H, CH$_{THF}$), 3.91-4.05 (m, 4H, CH$_{2,methylene}$) 6.81-6.85 (m, 4H, CH$_p$), 6.98-7.03 (m, 8H, CH$_m$), 7.27-7.30 (m, 8H, CH$_o$) ppm.

$^{13}$C NMR (125 MHz, toluene-d$_8$, 300K): δ=27.3 (s, CH$_{2,THF}$), 70.5 (d, CH$_{2,methylene}$, $^2J_{C-P}$=6.3 Hz), 78.1 (d, CH$_{THF}$, $^3J_{C-P}$=7.5 Hz), 120.6 (d, CH$_o$, $^2J_{C-P}$=4.6 Hz), 125.4 (s, CH$_p$), 129.9 (s, CH$_m$), 151.4 (d, CH$_{i,isomer1}$, $^1J_{C-P}$=6.9 Hz), 151.4 (d, CH$_{i,isomer2}$, $^1J_{C-P}$=6.9 Hz) ppm.

$^{31}$P NMR (145 MHz, toluene-d$_8$, 300K): δ=−15.8 ("t", J=18.4 Hz) ppm.

ESI(+)-HRMS (m/z): calc.: 597.1443 [C$_{30}$H$_{31}$O$_9$P$_2$]$^+$ found: 597.1429 [M+H]$^+$.

TGA (under argon): 260° C. (2% mass loss), 265° C. (5% mass loss), 270° C. (10% mass loss).

A.7 2,3,4,5-Tetrahydrofuran-2,5-yldimethyl 2,5-bis(diphenylphosphinic ester) (IV.2)

Analytical Data:

$^1$H NMR (360 MHz, toluene-d$_8$, 300K): =1.44-1.46 (m, 4H, CH$_{2,THF}$), 3.88-3.91 (m, 4H, CH$_{2,methylene}$), 3.97-4.03 (m, 2H, CH$_{THF}$), 7.08-7.18 (m, 12H, CH$_{m,p}$), 7.89-7.89 (m, 8H, CH$_o$) ppm.

$^{13}$C NMR (90 MHz, CDCl$_3$, 300K): δ=27.3 (s, CH$_{2, THF}$), 66.2 (d, CH$_{2,methylene}$, $^2J_{C-P}$=6.0 Hz), 78.1 (d, CH$_{THF}$, $^3J_{C-P}$=7.3 Hz), 128.2 (d, CH$_{m,isomer1/2}$, $^3J_{C-P}$=2.0 Hz), 128.4 (d, CH$_{m,isomer1/2}$, $^3J_{C-P}$=2.0 Hz), 130.1 (d, CH$_{i, isomer1/2}$, $^1J_{C-P}$=10.6 Hz), 131.3 (d, CH$_{o, isomer1/2}$, $^2J_{C-P}$=10.3 Hz), 131.4 (d, CH$_{o, isomer1/2}$, $^2J_{C-P}$=10.0 Hz), 131.6 (d, CH$_{i, isomer1/2}$, $^1J_{C-P}$=11.0 Hz), 132 ("t", CH$_{p, isomer1/2}$) ppm.

$^{31}$P-NMR (145 MHz, toluene-d$_8$, 300K): δ=25.2 (m) ppm.

ESI(+)-HRMS (m/z): calc.: 533.1647 [C$_{30}$H$_{31}$O$_5$P$_2$]$^+$ found: 533.1629 [M+H]$^+$.

TGA (under argon): 307° C. (2% mass loss), 320° C. (5% mass loss), 323° C. (10% mass loss).

A.8 2,3,4,5-Tetrahydrofuran-2,5-yldimethyl 2,5-bis(diphenylthiophosphinic ester) (IV.3)

Analytical Data:

$^1$H NMR (360 MHz, CDCl$_3$, 300K): =1.65-1.80 (m, 2H, CH$_{2, THF}$), 1.82-2.00 (m, 2H, CH$_{2, THF}$), 3.90-4.04 (m, 4H, CH$_{2,methylene}$), 4.15-4.30 (m, 2H, CH$_{THF}$), 7.32-7.43 (m, 12H, CH$_{m,p}$), 7.82-7.93 (m, 8H, CH$_o$) ppm.

$^{13}$C NMR (125 MHz, CDCl$_3$, 300K): δ=27.5 (s, CH$_{2,THF}$), 66.3 (d, CH$_{2,methylene}$, $^2J_{C-P}$=6.0 Hz), 78.1 (d, CH$_{THF}$, $^3J_{C-P}$=8.6 Hz), 128.2 (d, CH$_{m,isomer1/2}$, $^3J_{C-P}$=4.6 Hz), 128.3 (d, CH$_{m,isomer1/2}$, $^3J_{C-P}$=4.0 Hz), 130.9 (d, CH$_{o,isomer1/2}$, $^2J_{C-P}$=13.8 Hz), 131.0 (d, CH$_{o,isomer1/2}$, $^3J_{C-P}$=13.8 Hz), 131.7 (d, CH$_{p,isomer1/2}$, $^4J_{C-P}$=2.9 Hz), 131.7 (d, CH$_{p,isomer1/2}$, $^4J_{C-P}$=2.9 Hz), 133.6 (d, CH$_{i,isomer1/2}$, $^1J_{C-P}$=27.0 Hz), 134.5 (d, CH$_{i,isomer1/2}$, $^1J_{C-P}$=27.0 Hz) ppm.

$^{31}$P NMR (145 MHz, CDCl$_3$, 300K): δ=83.2 (m) ppm.

ESI(+)-HRMS (m/z): calc.: 565.1190 [C$_{30}$H$_{31}$O$_2$P$_2$S$_2$]$^+$ found: 565.1165 [M+H]$^+$.

TGA (under argon): 323° C. (2% mass loss), 329° C. (5% mass loss), 333° C. (10% mass loss).

A.9 2,3,4,5-Tetrahydrofuran-2,5-yldimethyl 2,5-bis(diphenylphosphinite) (IV.4)

Analytical Data:

$^1$H NMR (360 MHz, CDCl$_3$, 300K): =1.67-1.94 (m, 4H, CH$_{2,THF}$), 3.71-3.85 (m, 4H, CH$_{2,methylene}$), 4.08-4.22 (m, 2H, CH$_{THF}$), 7.25-7.32 (m, 12H, CH$_{m,p}$), 7.44-7.52 (m, 8H, CH$_o$) ppm.

$^{13}$C NMR (125 MHz, CDCl$_3$, 300K): δ=27.7 (s, CH$_{2,THF}$), 72.1 (d, CH$_{2,methylene}$, $^2J_{C-P}$=17.8 Hz), 79.0 (d, CH$_{THF}$, $^3J_{C-P}$=8.0 Hz), 128.1 (d, CH$_m$, $^3J_{C-P}$=6.9 Hz), 129.1 (s, CH$_p$), 130.2 (d, CH$_o$, $^2J_{C-P}$=21.8 Hz), 141.7 (d, CH$_{i, isomer1}$, $^1J_{C-P}$=5.7 Hz), 141.9 (d, CH$_{i, isomer2}$, $^1J_{C-P}$=6.3 Hz) ppm.

$^{31}$P NMR (145 MHz, CDCl$_3$, 300K): δ=115.7 (product, "heptet", J=7.6 Hz), 116.4 (byproduct, "quintet", J=7.6 Hz) ppm.

ESI(+)-HRMS (m/z): calc.: 501.1748 [C$_{30}$H$_{31}$O$_3$P$_2$]$^+$ found: 501.1762 [M+H]$^+$.

TGA (under argon): 310° C. (2% mass loss), 336° C. (5% mass loss), 347° C. (10% mass loss).

B. Application Examples

Flame Retardancy Tests:

Description of the Tests:

The fire performance of the foam sheets was determined unless specified otherwise, to DIN 4102 (fire test B2), the density of the foam being 15 kg/m$^3$.

As a comparison, hexabromocyclododecane was used (referred to hereinafter as HBCD).

Expandable Styrene Polymers (Extrusion Process)

7 parts by weight of n-pentane were incorporated by mixing into a polystyrene melt composed of PS 148H (Mw=240 000 g/mol, Mn=87 000 g/mol, determined by means of GPC, RI detector, polystyrene (PS) as standard) from BASF SE with a viscosity number VN of 83 ml/g. After the cooling of the melt, comprising blowing agent, from an original 260° C. to a temperature of 190° C., a polystyrene melt containing the flame retardants specified in the table was mixed into the main stream via a side-stream extruder.

The stated amounts in parts by weight are based on the overall polystyrene amount.

The mixture composed of polystyrene melt, blowing agent and flame retardant was conveyed at 60 kg/h through a die plate having 32 holes (die diameter 0.75 mm). With the aid of a pressure-actuated underwater pelletizer, compact pallets with a narrow size distribution were produced.

The molecular weight of the granules was 220 000 g/mol (Mw) or 80 000 g/mol (Mn) (determined by GPC, RI detector, PS as standard). By exposure to flowing steam, the pellets were subjected to preliminary foaming and, after storage for 12 hours, by further treatment with steam, were welded in a closed mold to form foam blocks with a density of 15 kg/m3. The fire performance of the foam blocks was determined after 72 hours of storage at a foam density of 15 kg/m3 in accordance with DIN 4102.

The results are compiled in Table 1a (IE.1-IE.12).

Expandable Styrene Polymers (Suspension Process)

For the production of EPS, dibenzoyl peroxide, dicumyl peroxide, optionally other synergists and Ceridust 3620 (polyethylene wax, Clariant) were dissolved in styrene. The phosphorus-containing flame retardant of the invention was added to this solution. The organic phase was introduced into fully demineralized water in a stirred tank. The aqueous phase additionally contained sodium pyrophosphate and also magnesium sulfate*heptahydrate (bitter salt). The suspension was heated over the course of 1.75 hours to 104° C. and then over 5.5 hours to 136° C. 1.8 hours after the attainment of 80° C., Emulgator K30 (a mixture of different linear alkylsulfonates, Lanxess AG, as emulsifier) was metered in. After a further hour, 7.8% by weight of pentane was added. Finally, polymerization was completed at an end temperature of 136° C.

The blowing-agent-comprising polystyrene beads obtained were separated off by decanting, dried to remove internal water and coated with a standard EPS coating.

By exposure to flowing steam, the polystyrene beads comprising blowing agent were subjected to preliminary foaming and, after storage for 12 hours, by further treatment with steam, were welded in a closed mold to form foam blocks with a density of 15 kg/m3. The fire performance of the foam blocks was determined after 72 hours of storage at a foam density of 15 kg/m3 in accordance with DIN 4102.

The suspension polymerization results are compiled in Table 1 b (IE.13-IE.20).

TABLE 1a

Fire performance of inventive polymer composition (inventive examples) and of comparative examples (in italics)

| Example | Flame retardant (pts by wt. based on 100 pts by wt. of polystyrene) | Addition of synergist (pts by wt. based on 100 pts by wt. of polystyrene) | Fire test (B2 to DIN 4102)/ extinguishment time (s) |
|---|---|---|---|
| *CE1* | — | — | *Not passed/ consumed by combustion* |
| *CE2* | HBCD (4.0) | — | *passed/6.4 s* |
| IE.1 | II.1 (2.5) | Sulfur (2.5) | passed/5.7 s |
| IE.2 | II.2 (2.5) | Sulfur (2.5) | passed/5.9 s |
| IE.3 | II.3 (2.5) | Sulfur (2.5) | passed/7.0 s |
| IE.4 | II.4 (2.5) | Sulfur (2.5) | passed/5.7 s |
| IE.5 | III.1 (5.0) | Sulfur (5.0) | passed/7.9 s |
| IE.6 | III.2 (5.0) | Sulfur (5.0) | passed/8.7 s |
| IE.7 | III.3 (5.0) | Sulfur (5.0) | passed/8.8 s |
| IE.8 | III.4 (5.0) | Sulfur (5.0) | passed/9.1 s |
| IE.9 | IV.1 (5.0) | Sulfur (2.5) | passed/6.6 s |
| IE.10 | IV.2 (2.5) | Sulfur (2.5) | passed/6.6 s |
| IE.11 | IV.3 (2.5) | Sulfur (2.5) | passed/7.0 s |
| IE.12 | IV.4 (2.5) | Sulfur (2.5) | passed/7.5 s |

TABLE 1b

Fire behavior of polymer composition of the invention (inventive examples) and of comparative examples

| Example | Flame retardant (% by wt. based on styrene) | Synergist (% by wt. based on styrene) | Fire test (B2 to DIN 4102)/ extinguishment time (s) |
|---|---|---|---|
| *CE3* | — | — | *Not passed/ consumed by combustion* |
| *CE4* | HBCD (3.5) | — | *passed/7.1 s* |
| IE.13 | II.1 (5.0) | DCP[1] (1.5) | *passed/6.4 s* |
| IE.14 | II.1 (6.0) | DCP[1] (1.7) | *passed/5.6 s* |
| IE.15 | II.2 (6.0) | DCP[1] (1.5) | *passed/9.2 s* |
| IE.16 | II.3 (6.0) | DCP[1] (1.5) | *passed/7.4 s* |
| IE.17 | II.4 (6.0) | DCP[1] (1.5) | *passed/10.6 s* |
| IE.18 | IV.1 (6.0) | DCP[1] (1.7) | *passed/8.7 s* |
| IE.19 | IV.3 (6.0) | DCP[1] (1.7) | *passed/6.9 s* |
| IE.20 | IV.4 (5.0) | DCP (1.7) | *passed/11.2 s* |

[1]Dicumyl peroxide (CAS: 80-43-3)

TABLE 2

Effect of foam density of polystyrene foam specimens produced from EPS on the fire outcome. The parts described in the examples are parts by weight.

| Ex. | Flame retardant (parts by weight) | Foam density [kg/m3] (ISO 845) | Fire test (B2 to DIN 4102)/Extinguishment time (s) |
|---|---|---|---|
| IE.1  | II.1 (2.5) + sulfur (2.5) | 15.8  | passed/5.7 s |
| IE.21 | II.1 (2.5) + sulfur (2.5) | 61.5  | passed/10.2 s |
| IE.22 | II.1 (2.5) + sulfur (2.5) | 109.3 | passed/13.6 s |

Extruded Polystyrene Foam Sheets 100 parts by weight of polystyrene 158K (Mw=261 000 g/mol, Mn=77 000 g/mol determined by GPC, RI detector, PS as standard) from BASF SE, having a viscosity number of 98 ml/g, 0.1 part of talc as nucleating agent for regulating the cell size, and the parts of flame retardants as indicated in the table, and also, optionally sulfur or other synergists, were fed continuously to an extruder having an internal screw diameter of 120 mm. An inlet opening made into the extruder was used for the continuous injection, at the same time, of a blowing agent mixture composed of 3.25 parts by weight of ethanol and 3.5 parts by weight of $CO_2$. The gel, kneaded uniformly in the extruder at 180° C., was passed through a calming zone and, after a residence time of 15 minutes, was extruded with an exit temperature of 105° C. through a die having a width of 300 mm and a breadth of 1.5 mm into the atmosphere. The foam was passed through a shaping channel which was connected to the extruder, and produced a foamed sheet web having a cross section of 650 mm×50 mm and a density of 35 g/l. The molecular weight of the polystyrene was 240 000 g/mol (Mw) and 70 000 g/mol (Mn) (determined by GPC, RI detector, PS as standard). The product was cut into sheets. The fire behavior of the samples, with thicknesses of 10 mm, was tested after a storage time of 30 days in accordance with DIN 4102.

The results of the examples are summarized in Table 3.

TABLE 3

| Ex. | Flame retardant (parts by weight) | Addition of synergist (parts by weight) | Fire test (B2 to DIN 4102)/Extinguishment time (s) |
|---|---|---|---|
| CE5   | HBCD (4.0) |              | passed/9.4 s  |
| IE.23 | II.1 (2.5) | Sulfur (2.5) | passed/7.1 s  |
| IE.24 | II.2 (2.5) | Sulfur (2.5) | passed/8.7 s  |
| IE.25 | II.3 (2.5) | Sulfur (2.5) | passed/9.1 s  |
| IE.26 | II.4 (2.5) | Sulfur (2.5) | passed/11.7 s |
| IE.27 | III.2 (5.0)| Sulfur (5.0) | passed/10.9 s |
| IE.28 | IV.1 (5.0) | Sulfur (2.5) | passed/7.3 s  |
| IE.29 | IV.3 (2.5) | Sulfur (2.5) | passed/8.0 s  |
| IE.30 | IV.4 (2.5) | Sulfur (2.5) | passed/9.5 s  |

The application examples confirm that when the flame retardants of the invention are used it is possible to produce a foam which does not use halogenated flame retardants but which nevertheless has fire performance better than, or the same as, that obtained when those agents are used.

The invention claimed is:

1. A process for providing flame retardancy to a material, comprising adding a phosphorus compound selected from compounds II.1 to II.4 and compounds of the formula (I) to the material as flame retardant,

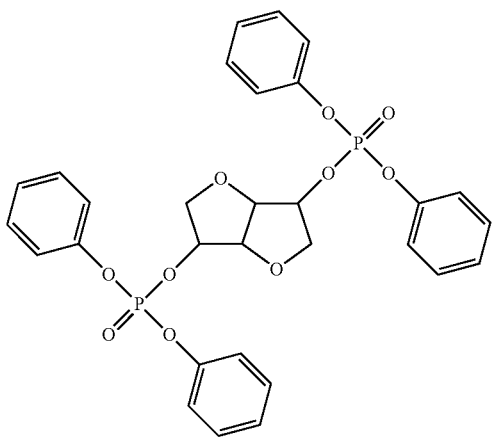

II.1

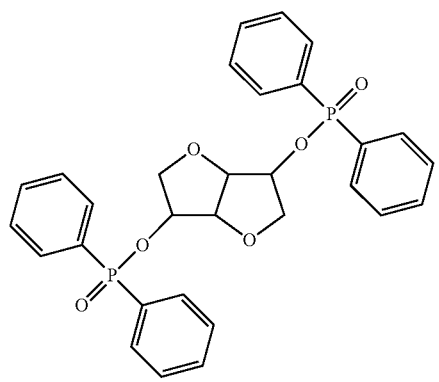

II.2

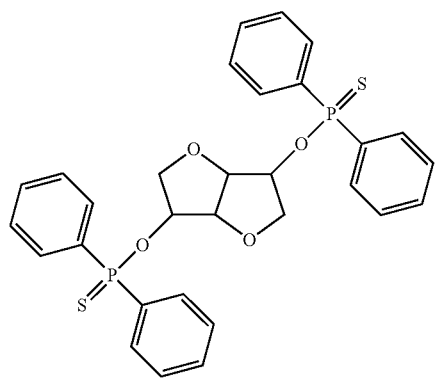

II.3

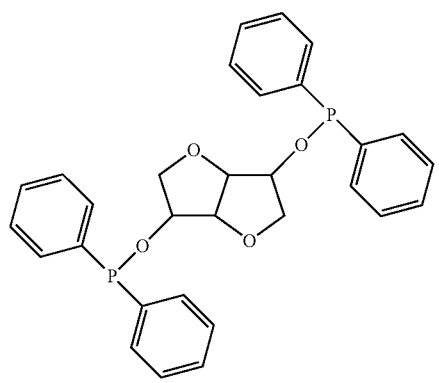

II.4

-continued

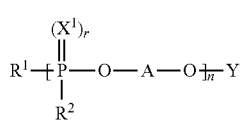
(I)

where the definitions of the symbols in the formula (I) are as follows:

A is one of the following groups:

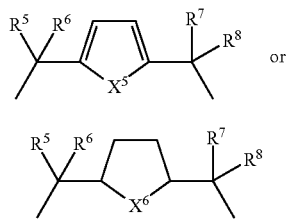

Y is —P(=$X^2$)$_s$$R^3$$R^4$, H, a straight-chain or branched $C_1$-$C_{12}$-alkyl group, $C_5$-$C_6$-cycloalkyl, $C_6$-$C_{12}$-aryl, or benzyl, where the four last-mentioned groups are unsubstituted or have substitution by one or more radicals $C_1$-$C_4$-alkyl or $C_2$-$C_4$-alkenyl;

$R^1$, $R^2$, $R^3$, and $R^4$ are identical or different and are hydrogen, OH, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$ $COR^{10}$, $COOR^{11}$, $CONR^{12}R^{13}$ or two radicals $R^1$, $R^2$, $R^3$, or $R^4$ form, together with the phosphorus atom to which they are bonded, or the P—O-A-O—P group, a ring system;

$R^5$, $R^6$, $R^7$, and $R^8$ are identical or different and are H, $C_1$-$C_{16}$-alkyl, $C_2$-$C_{16}$-alkenyl, $C_1$-$C_{16}$-alkoxy or $C_2$-$C_{16}$-alkenoxy;

$R^9$, $R^{10}$, $R^{11}$, $R^{12}$, $R^{13}$ are identical or different and are H, $C_1$-$C_{16}$-alkyl, $C_2$-$C_{16}$-alkenyl, $C_6$-$C_{10}$-aryl, $C_6$-$C_{10}$-aryl-$C_1$-$C_{16}$-alkyl or $C_6$-$C_{10}$-aryl-$C_1$-$C_{16}$-alkoxy;

$X^1$ and $X^2$ are identical or different and are S or O;

r and s are identical or different and are 0 or 1;

$X^5$ and $X^6$ are identical or different and are S or O, and n is a natural number from 1 to 50.

2. The process according to claim 1, wherein

A is a group of the formula (III) or (IV);

Y is ($X^2$)$_r$P$R^3$$R^4$, or H;

$R^1$, $R^2$, $R^3$, and $R^4$ are identical or different and are $C_6$-$C_{10}$-aryloxy, $C_1$-$C_{10}$-aryl-$C_1$-$C_{16}$-alkyl or $C_6$-$C_{10}$-aryl-$C_1$-$C_{16}$-alkoxy;

$R^5$, $R^6$, $R^7$, and $R^8$ are identical or different and are H, $C_1$-$C_{16}$-alkyl, $C_2$-$C_{16}$-alkenyl, $C_1$-$C_{16}$-alkoxy, $C_2$-$C_{16}$-alkenoxy;

$X^1$ and $X^2$ are identical or different and are S or O;

r and s are identically 0 or 1;

$X^5$ and $X^6$ are O, and n is a natural number from 1 to 30.

3. The process according to claim 1, wherein

A is a group of the formula (III) or (IV);

Y is ($X^2$)$_r$P$R^3$$R^4$;

$R^1$, $R^2$, $R^3$, and $R^4$ are identical or different and are phenyl, phenoxy, phenyl-$C_1$-$C_{16}$-alkyl, or phenyl-$C_1$-$C_{16}$-alkoxy;

$R^5$, $R^6$, $R^7$, and $R^8$ are H;

$X^1$ and $X^2$ are identical or different and are S or O;

r and s are identically 0 or 1;

$X^5$ and $X^6$ are O, and n is 1.

4. The process according to claim 1, wherein

A is a group of the formula (III) or (IV);

Y is ($X^2$)$_r$P$R^3$$R^4$;

$R^1$, $R^2$, $R^3$, and $R^4$ are identically phenyl or phenoxy;

$R^5$, $R^6$, $R^7$, and $R^8$ are H;

$X^1$ and $X^2$ are identically S or O;

r and s are identically 0 or 1;

$X^5$ and $X^6$ are oxygen, and n is 1.

5. The process according to claim 1, wherein the compound of the formula (I) has been selected from:

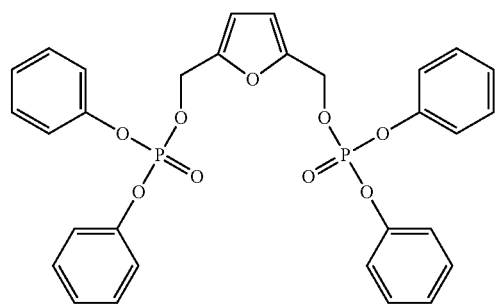
III.1

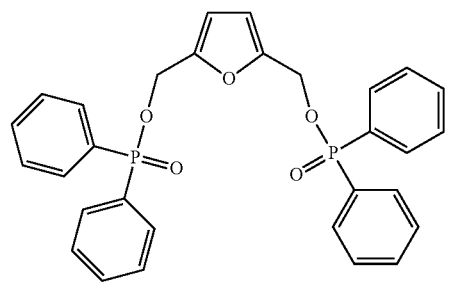
III.2

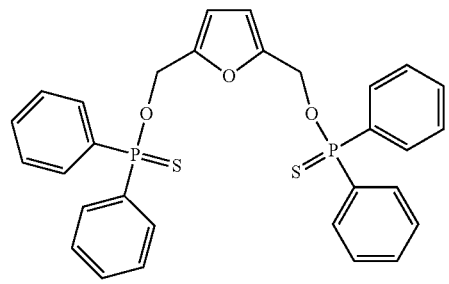
III.3

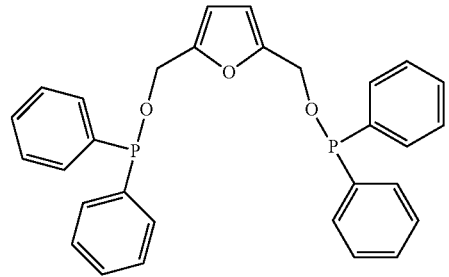
III.4

IV.1
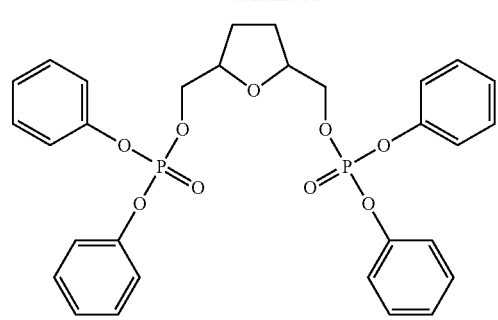

IV.2
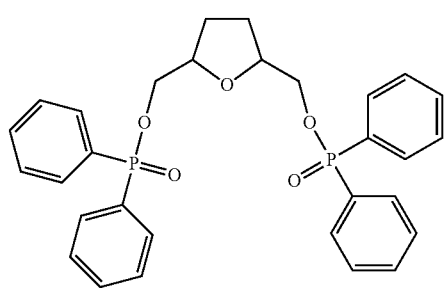

IV.3
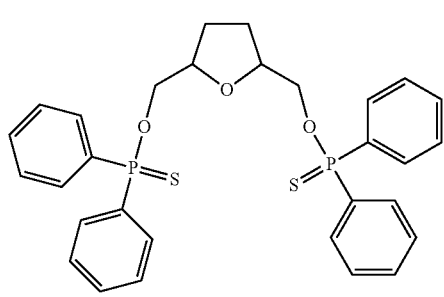

and

IV.4
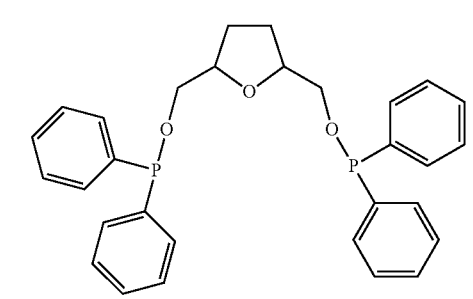

II.1
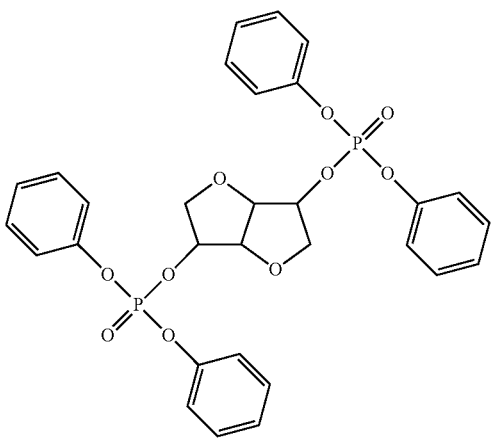

II.2
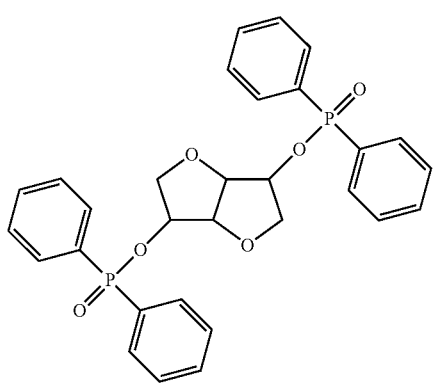

II.3
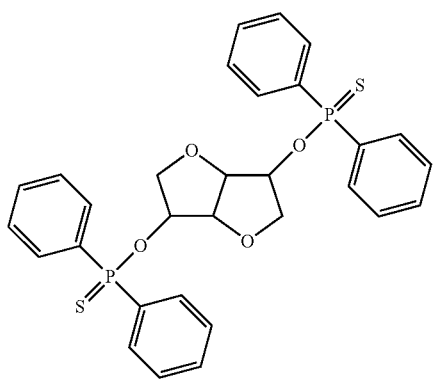

II.4
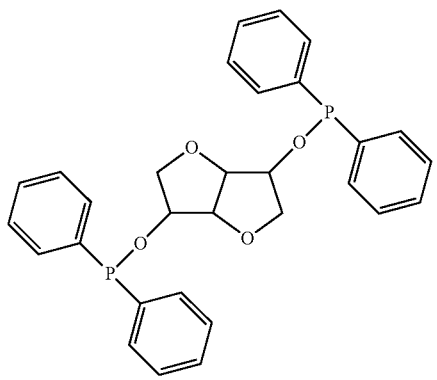

6. The process according to claim 1, wherein one compound of the formula (I) is added.

7. The process according to claim 1, wherein at least two different compounds of the formula (I) are added.

8. The process according to claim 1, wherein the compound(s) of the formula (I) is/are added in a mixture with one or more other flame-retardant compounds and/or with one or more synergists.

9. The process according to claim 8, wherein the synergist is used from the group consisting of organic peroxides, organic polysulfides, C—C-cleaving initiators, and elemental sulfur.

10. The process according to claim 1, wherein the material is a polymer material, comprising one or more polymers.

11. A polymer composition comprising one or more polymers and a flame retardant and wherein the flame retardant comprises a phosphorus compound selected from II.1 to II.4 and of the formula (I), -continued

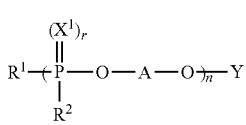
(I)

where the definitions of the symbols in the formula (I) are as follows:

A is one of the following groups:

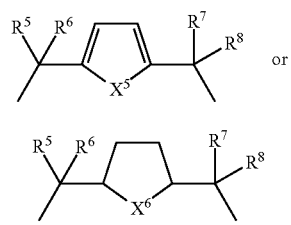

Y is —P(=$X^2$)$_s$$R^3$$R^4$, H, a straight-chain or branched $C_1$-$C_{12}$-alkyl group, $C_5$-$C_6$-cycloalkyl, $C_6$-$C_{12}$-aryl, or benzyl, where the four last-mentioned groups are unsubstituted or have substitution by one or more radicals $C_1$-$C_4$-alkyl or $C_2$-$C_4$-alkenyl;

$R^1$, $R^2$, $R^3$, and $R^4$ are identical or different and are hydrogen, OH, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$ $COR^{10}$, $COOR^{11}$, $CONR^{12}R^{13}$ or two radicals $R^1$, $R^2$, $R^3$, or $R^4$ form, together with the phosphorus atom to which they are bonded, or the P—O-A-O—P group, a ring system;

$R^5$, $R^6$, $R^7$, and $R^8$ are identical or different and are H, $C_1$-$C_{16}$-alkyl, $C_2$-$C_{16}$-alkenyl, $C_1$-$C_{16}$-alkoxy or $C_2$-$C_{16}$-alkenoxy;

$R^9$, $R^{10}$, $R^{11}$, $R^{12}$, $R^{13}$ are identical or different and are H, $C_1$-$C_{16}$-alkyl, $C_2$-$C_{16}$-alkenyl, $C_6$-$C_{10}$-aryl, $C_6$-$C_{10}$-aryl-$C_1$-$C_{16}$-alkyl or $C_6$-$C_{10}$-aryl-$C_1$-$C_{16}$-alkoxy;

$X^1$ and $X^2$ are identical or different and are S or O;

r and s are identical or different and are 0 or 1;

$X^5$ and $X^6$ are identical or different and are S or O, and n is a natural number from 1 to 50.

12. The polymer composition according to claim 11, comprising from 0.1 to 25% by weight (based on polymer content) of the flame retardant.

13. The polymer composition according to claim 11, which is halogen-free.

14. The polymer composition according to claim 11, comprising a styrene polymer.

15. The polymer composition according to claim 11, wherein the polymer is a polymer foam.

16. The polymer composition according to claim 14 in the form of an expandable styrene polymer (EPS).

17. A process for the production of the expandable styrene polymer (EPS) according to claim 16, comprising the following steps:

a) mixing to incorporate an organic blowing agent and one or more compounds of II.1 to II.4 and/or of the formula (I) according to claim 1 and optionally further auxiliaries and additives into a styrene polymer melt by means of static and/or dynamic mixers at a temperature of at least 150° C., b) cooling of the styrene polymer melt comprising blowing agent to a temperature of at least 120° C., c) discharging through a die plate with holes, the diameter of which at the exit from the die is at most 1.5 mm, and d) pelletization of the melt comprising blowing agent directly behind the die plate under water at a pressure in the range from 1 to 20 bar.

18. A process for the production of the expandable styrene polymer according to claim 16, comprising the following steps:

a) polymerizing one or more styrene monomers in suspension;

b) adding one or more compounds of II.1 to II.4 and/or of the formula (I) and optionally further auxiliaries and additives before, during and/or after the polymerization, c) adding an organic blowing agent before, during and/or after the polymerization and d) separating the expandable styrene polymer particles, comprising one or more compounds of II.1 to II.4 and/or of the formula (I), from the suspension.

19. The polymer composition according to claim 15 in the form of an extruded styrene polymer foam (XPS).

20. A process for the production of the extruded styrene foam (XPS) according to claim 19, comprising the following steps:

a) heating a polymer component P which comprises at least one styrene polymer, to form a polymer melt, b) incorporating a blowing agent component T into the polymer melt to form a foamable melt, c) extruding the foamable melt in a relatively low-pressure range with foaming, to given an extrusion foam, and d) adding at least one compound of II.1 to II.4 and/or of the formula (I) as flame retardant and optionally of further auxiliaries and additives in at least one of steps a) and b).

21. An insulating material comprising a halogen-free polymer composition according to claim 13.

22. An insulating material comprising the polymer composition according to claim 16 in expanded form.

23. A phosphorus compound selected from II.1 to II.4 and of the formula (I),

II.1

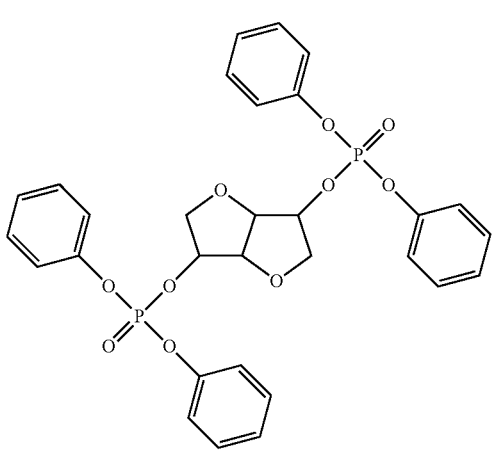

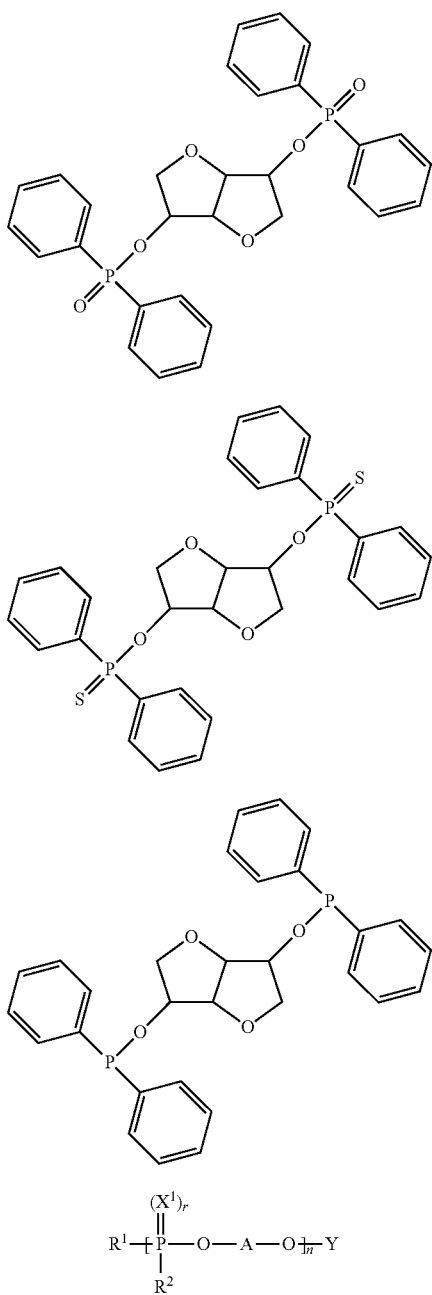

where the definitions of the symbols in the formula (I) are as follows:
A is one of the following groups:

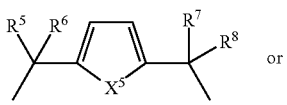

(III)

or

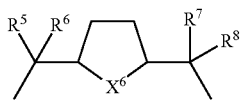

(IV)

Y is —P(=$X^2$)$_s$$R^3$$R^4$, H, a straight-chain or branched $C_1$-$C_{12}$-alkyl group, $C_5$-$C_6$-cycloalkyl, $C_6$-$C_{12}$-aryl, or benzyl, where the four last-mentioned groups are unsubstituted or have substitution by one or more radicals $C_1$-$C_4$-alkyl or $C_2$-$C_4$-alkenyl;

$R^1$, $R^2$, $R^3$, and $R^4$ are identical or different and are hydrogen, OH, $C_1$-$C_{16}$-alkyl, $C_2$-$C_{16}$-alkenyl, $C_1$-$C_{16}$-alkoxy, $C_2$-$C_{16}$-alkenoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_{16}$-alkyl, $C_6$-$C_{10}$-aryl-$C_1$-$C_{16}$-alkoxy, $SR^9$ $COR^{10}$, $COOR^{11}$, $CONR^{12}R^{13}$ or two radicals $R^1$, $R^2$, $R^3$, or $R^4$ form, together with the phosphorus atom to which they are bonded, or the P—O-A-O—P group, a ring system;

$R^5$, $R^6$, $R^7$, and $R^8$ are identical or different and are H, $C_1$-$C_{16}$-alkyl, $C_2$-$C_{16}$-alkenyl, $C_1$-$C_{16}$-alkoxy or $C_2$-$C_{16}$-alkenoxy;

$R^9$, $R^{10}$, $R^{11}$, $R^{12}$, $R^{13}$ are identical or different and are H, $C_1$-$C_{16}$-alkyl, $C_2$-$C_{16}$-alkenyl, $C_6$-$C_{10}$-aryl, $C_6$-$C_{10}$-aryl-$C_1$-$C_{16}$-alkyl or $C_6$-$C_{10}$-aryl-$C_1$-$C_{16}$-alkoxy;

$X^1$ and $X^2$ are identical or different and are S or O;

r and s are identical or different and are 0 or 1;

$X^5$ and $X^6$ are identical or different and are S or O, and n is a natural number from 1 to 50, with the exception of the following compounds selected from the group consisting of:

2,5-anhydro-3,4-dideoxyhexitol bis(dihydrogenphosphate), 1,4:3,6-dianhydrohexitol 2,5-bis(P,P-diphenylphosphinite), 1,4:3,6-dianhydrohexitol bis(dipropylphosphinate), 1,4:3,6-dianhydrohexitol bis(diethylphosphinite), 1,4:3,6-dianhydrohexitol bis(dipropylphosphinothioate), 1,4:3,6-dianhydrohexitol bis(diphenylphosphinothioate), 1,4:3,6-dianhydro-2,5-bis-O-(5,5-dimethyl-1,3,2-dioxaphosphorinan-2-yl)hexitol, 1,4:3,6-dianhydro-2,5-di-O-1,3,2-benzodioxaphosphol-2-ylhexitol, 1,4:3,6-dianhydro-2,5-bis-O-(6-sulfidodibenzo[d,f][1,3,2]dioxaphosphepin-6-yl)hexitol, 1,4:3,6-dianhydrobis(dihydrogenphosphite)hexitol, 1,4:3,6-dianhydro-2,5-bis-O-[(11bR)-dinaphtho[2,1-d:1',2'-f][1,3,2]dioxaphosphepin-4-yl]hexitol, 1,4:3,6-dianhydro-2,5-bis-O-(16H-dinaphtho[2,1-d:1',2'-g][1,3,2]dioxaphosphocin-8-yl)hexitol, 1,4:3,6-dianhydro-2,5-bis-O-[2,4,8,10-tetrakis(1,1-dimethylethyl)dibenzo[d,f][1,3,2]dioxaphosphepin-6-yl]hexitol, 1,4:3,6-dianhydro-2,5-bis-O-(4,8-dimethyldibenzo[d,f][1,3,2]dioxaphosphepin-6-yl)hexitol, 1,4:3,6-dianhydro-2,5-di-O-dibenzo[d,f][1,3,2]dioxaphosphepin-6-ylhexitol, 1,4:3,6-dianhydrobis(di-2-naphthalenyl phosphite)hexitol, 1,4:3,6-dianhydro-2,5-bis-O-(5-methyl-5-propyl-1,3,2-dioxaphosphorinan-2-yl)hexitol, 1,4:3,6-dianhydrobis[bis(2-ethylhexyl)phosphite]hexitol, 1,4:3,6-dianhydro-2,5-bis-O-(5,5-dimethyl-2-sulfido-1,3,2-dioxaphosphorinan-2-yl)hexitol, 1,4:3,6-dianhydro-2,5-bis-O-(5,5-dimethyl-1,3,2-dioxaphosphorinan-2-yl)hexitol, 1,4:3,6-dianhydrohexitol bis(dipropylphosphinite), 1,4:3,6-dianhydrohexitol bis(methylphosphonite), 1,4:3,6-dianhydrohexitol bis(hydrogenphosphonate), 1,4:3,6-dianhydro-D-glucitol 2,5':2',5-bis(phenylphosphonothioate), 1,4:3,6-dianhydrohexitol 2,2'-(2-hexyldecyl phosphite) 5,5'-bis[bis(2-hexyldecyl)phosphite, hexitol-2,3,4,5-tetradeoxy-2,5-epithio bis(diphenylphosphinite), hexitol-2,3,4,5-tetradeoxy-2,5-epithio bis[bis(2,4,6-trimethylphenyl)phosphonite],
hexitol-2,3,4,5-tetradeoxy-2,5-epithio bis(dicyclohexylphosphinite), and
hexitol-2,3,4,5-tetradeoxy-2,5-epithio bis(diethylphosphinite).

* * * * *